(12) United States Patent
Makin et al.

(10) Patent No.: US 12,218,518 B2
(45) Date of Patent: Feb. 4, 2025

(54) SYSTEM AND METHOD FOR POWERING AN IMPLANTABLE DEVICE USING ACOUSTIC ENERGY

(71) Applicant: Piezo Energy Technologies LLC, Mesa, AZ (US)

(72) Inventors: Inder Raj S. Makin, Mesa, AZ (US); Paul Jaeger, Mesa, AZ (US); Leon J. Radziemski, Tucson, AZ (US)

(73) Assignee: UltraPower, Inc., New York, NY (US)

( * ) Notice: Subject to any disclaimer, the term of this patent is extended or adjusted under 35 U.S.C. 154(b) by 0 days.

(21) Appl. No.: 18/633,699

(22) Filed: Apr. 12, 2024

(65) Prior Publication Data

US 2024/0348102 A1 Oct. 17, 2024

Related U.S. Application Data

(60) Provisional application No. 63/496,090, filed on Apr. 14, 2023.

(51) Int. Cl.
*H02J 50/15* (2016.01)
*H02J 50/90* (2016.01)

(52) U.S. Cl.
CPC ............. *H02J 50/15* (2016.02); *H02J 50/90* (2016.02); *H02J 2310/23* (2020.01)

(58) Field of Classification Search
CPC ........ H02J 50/15; H02J 50/90; H02J 2310/23; A61B 1/00029; A61N 1/3787; A61M 2205/8243; A61M 60/873–875
See application file for complete search history.

(56) References Cited

U.S. PATENT DOCUMENTS

| | | |
|---|---|---|
| 4,160,234 A | 7/1979 | Karbo et al. |
| 4,748,366 A | 5/1988 | Taylor |

(Continued)

FOREIGN PATENT DOCUMENTS

| | | |
|---|---|---|
| CA | 2364853 A1 | 9/2000 |
| FR | 2616335 A1 | 12/1988 |

(Continued)

OTHER PUBLICATIONS

H. Basaeri et al., "A review of acoustic power transfer for biomedical implants", Smart Materials and Structures, 2016, No. 25, IOP Publishing Ltd., UK.

(Continued)

*Primary Examiner* — Rexford N Barnie
*Assistant Examiner* — David A Shiao
(74) *Attorney, Agent, or Firm* — Intrinsic Law Corp.

(57) ABSTRACT

A method for wirelessly powering a device includes: acoustically coupling an acoustic transmitter to an external surface of a mammal at an approximate location of an implantable device disposed in the mammal; producing, with the acoustic source, acoustic energy having a frequency in a frequency range of about 0.5 MHz to about 3 MHz; receiving the acoustic energy with one or more transducers in the implantable device, the one or more transducers electrically connected to an electric circuit, the one or more transducers having a length in a length range of about 1 wavelength to about 10 wavelengths of the acoustic energy; converting, with the one or more transducers, the acoustic energy to electric energy; and providing the electric energy to a device electrically connected to the electric circuit.

11 Claims, 21 Drawing Sheets

(56) References Cited

U.S. PATENT DOCUMENTS

| | | |
|---|---|---|
| 4,748,985 A | 6/1988 | Nagasaki |
| 5,237,239 A | 8/1993 | Inoue et al. |
| 5,239,518 A | 8/1993 | Kazmar |
| 5,300,875 A | 4/1994 | Tuttle |
| 5,320,104 A | 6/1994 | Fearnside et al. |
| 5,376,857 A | 12/1994 | Takeuchi et al. |
| 5,411,537 A | 5/1995 | Munshi et al. |
| 5,494,468 A | 2/1996 | Demarco, Jr. |
| 5,501,222 A | 3/1996 | Briggs |
| 5,545,942 A | 8/1996 | Jaster et al. |
| 5,555,887 A | 9/1996 | Fraser et al. |
| 5,560,362 A | 10/1996 | Sliwa et al. |
| 5,585,546 A | 12/1996 | Gururaja et al. |
| 5,629,599 A | 5/1997 | Malaspina et al. |
| 5,629,678 A | 5/1997 | Gargano et al. |
| 5,630,836 A | 5/1997 | Prem et al. |
| 5,671,746 A | 9/1997 | Dreschel et al. |
| 5,703,474 A | 12/1997 | Smalser |
| 5,749,909 A | 5/1998 | Schroeppel et al. |
| 5,751,091 A | 5/1998 | Takahashi et al. |
| 5,788,453 A | 8/1998 | Donde et al. |
| 5,810,015 A | 9/1998 | Flaherty |
| 5,835,996 A | 11/1998 | Hashimoto et al. |
| 5,889,383 A | 3/1999 | Teich |
| 5,918,502 A | 7/1999 | Bishop |
| 5,925,972 A | 7/1999 | Shrader et al. |
| 5,961,465 A | 10/1999 | Kelly, Jr. et al. |
| 5,998,910 A | 12/1999 | Park et al. |
| 6,185,452 B1 | 2/2001 | Schulman et al. |
| 6,196,932 B1 | 3/2001 | Marsh et al. |
| 6,201,336 B1 | 3/2001 | Burns |
| 6,215,733 B1 | 4/2001 | Rynne et al. |
| 6,224,493 B1 | 5/2001 | Lee et al. |
| 6,342,776 B1 | 1/2002 | Taylor et al. |
| 6,407,484 B1 | 6/2002 | Oliver et al. |
| 6,424,079 B1 | 7/2002 | Carroll |
| 6,432,050 B1 | 8/2002 | Porat et al. |
| 6,433,465 B1 | 8/2002 | McKnight et al. |
| 6,475,170 B1 | 11/2002 | Doron et al. |
| 6,579,315 B1 | 6/2003 | Weiss |
| 6,654,638 B1 | 11/2003 | Sweeney |
| 6,720,709 B2 | 4/2004 | Porat et al. |
| 6,737,789 B2 | 5/2004 | Radziemski et al. |
| 6,764,446 B2 | 7/2004 | Wolinsky et al. |
| 6,798,716 B1 | 9/2004 | Charych |
| 7,003,353 B1 | 2/2006 | Parkhouse |
| 7,024,248 B2 | 4/2006 | Penner et al. |
| 7,198,603 B2 | 4/2007 | Penner et al. |
| 7,283,874 B2 | 10/2007 | Penner |
| 7,314,447 B2 | 1/2008 | Park et al. |
| 7,489,967 B2 | 2/2009 | Von Arx et al. |
| 7,505,816 B2 | 3/2009 | Schmeling et al. |
| 8,082,041 B1 | 12/2011 | Radziemski |
| 8,364,276 B2 | 1/2013 | Willis |
| 8,594,806 B2 | 11/2013 | Cowley et al. |
| 8,718,773 B2 | 5/2014 | Willis et al. |
| 8,974,366 B1 | 3/2015 | Radziemski et al. |
| 9,199,096 B2 | 12/2015 | Lewis, Jr. |
| 9,480,863 B2 | 11/2016 | Lewis, Jr. et al. |
| 9,492,687 B2 | 11/2016 | Lewis, Jr. |
| 10,252,066 B2 | 4/2019 | Radziemski et al. |
| 11,033,746 B2 | 6/2021 | Maharbiz et al. |
| 2001/0032663 A1 | 10/2001 | Pelrine et al. |
| 2001/0035723 A1 | 11/2001 | Pelrine et al. |
| 2004/0002655 A1 | 1/2004 | Bolorforosh et al. |
| 2004/0172083 A1 | 9/2004 | Penner |
| 2005/0033316 A1 | 2/2005 | Kertz |
| 2005/0075696 A1 | 4/2005 | Forsberg et al. |
| 2005/0187594 A1 | 8/2005 | Hatlestad |
| 2005/0251044 A1 | 11/2005 | Hoctor et al. |
| 2005/0256549 A1 | 11/2005 | Holzer |
| 2005/0288739 A1 | 12/2005 | Hassler et al. |
| 2006/0136005 A1 | 6/2006 | Brisken et al. |
| 2007/0093875 A1 | 4/2007 | Chavan et al. |
| 2008/0021510 A1 | 1/2008 | Mi et al. |
| 2008/0108915 A1 | 5/2008 | Penner |
| 2008/0188755 A1 | 8/2008 | Hart |
| 2008/0294208 A1 | 11/2008 | Willis et al. |
| 2008/0312720 A1 | 12/2008 | Tran et al. |
| 2009/0228072 A1 | 9/2009 | Coe et al. |
| 2009/0259273 A1 | 10/2009 | Figueiredo et al. |
| 2011/0004278 A1* | 1/2011 | Aghassian ............... H02J 50/90 607/61 |
| 2011/0275963 A1 | 11/2011 | Wagner et al. |
| 2013/0178915 A1 | 7/2013 | Radziemski et al. |
| 2015/0080639 A1* | 3/2015 | Radziemski ........ A61M 60/875 600/16 |
| 2016/0015972 A1 | 1/2016 | Hyde et al. |
| 2016/0302692 A1 | 10/2016 | Demmer |
| 2017/0194820 A1* | 7/2017 | Hall ..................... A61N 1/3787 |
| 2017/0256988 A1* | 9/2017 | Joyce ..................... H02J 50/10 |
| 2017/0271919 A1* | 9/2017 | Von Novak, III ...... H02J 50/05 |
| 2017/0319858 A1* | 11/2017 | Radziemski ........ A61N 1/37223 |
| 2018/0140850 A1* | 5/2018 | Linder ................... H02J 50/12 |
| 2018/0262014 A1* | 9/2018 | Bell ..................... G06V 10/143 |
| 2019/0229560 A1* | 7/2019 | Von Novak, III ...... H02J 50/15 |
| 2019/0321640 A1 | 10/2019 | Carmena et al. |
| 2019/0321644 A1 | 10/2019 | Maharbiz et al. |
| 2021/0268294 A1 | 9/2021 | Maharbiz et al. |
| 2021/0308462 A1 | 10/2021 | Carmena et al. |
| 2022/0047869 A1 | 2/2022 | Carmena et al. |
| 2022/0062650 A1 | 3/2022 | Maharbiz et al. |
| 2022/0131424 A1* | 4/2022 | Charthad ............. H04B 13/005 |
| 2022/0143414 A1 | 5/2022 | Maharbiz et al. |
| 2022/0378303 A1* | 12/2022 | Melodia ................. H02J 50/15 |
| 2024/0024032 A1* | 1/2024 | Kay ..................... A61B 8/0833 |

FOREIGN PATENT DOCUMENTS

| | | |
|---|---|---|
| JP | 2000350708 A | 12/2000 |
| WO | 1999051303 A1 | 10/1999 |
| WO | 2000056241 A1 | 9/2000 |
| WO | 2006119098 A1 | 11/2006 |
| WO | 2008156981 A2 | 12/2008 |

OTHER PUBLICATIONS

B. Cotte et al., "Theoretical Study for Safe and Efficient Energy Transfer to Deeply Implanted Devices Using Ultrasound", IEEE Transactions on Ultrasonics, Ferroelectrics, and Frequency Control, Aug. 2012, p. 1674-1686, vol. 59, No. 8, IEEE.

M. Langer et al., "Hydrogel Materials as Ultrasound Coupling Media", American Institute of Ultrasound in Medicine Proceedings, J. Ultrasound Med, 2013, p. 539, 32(suppl.):S1-S134.

G. K. Lewis Jr. et al., "Design and Evaluation of a Wearable Self-Applied Therapeutic Ultrasound Device for Chronic Myofascial Pain", Ultrasound in Med. & Biol., 2013, p. 1429-1439, vol. 39, No. 8, Elsevier.

Inder Raj S. Makin et al., "Miniaturized Ultrasound Arrays for Interstitial Ablation and Imaging", Ultrasound in Med. & Biol., 2005, pp. 1539-1550, vol. 31, No. 11, World Federation for Ultrasound in Medicine & Biology, USA.

T. D. Mast et al., "Bulk ablation of soft tissue with intense ultrasound: Modeling and experiments", Oct. 4, 2005, pp. 2715-2724, vol. 118, No. 4, Acoustical Society of America.

Changki Mo et al., "Effect of misalignment between ultrasound piezoelectric transducers on transcutaneous energy transfer", Active and Passive Smart Structures and Integrated Systems, 2013, vol. 8688, 868814, SPIE.

C. Nistorica et al., "Characterization of a 3D-MEMS Piezoelectric Transducer for Portable Imaging Systems", IEEE International Ultrasonics Symposium Proceedings, 2015, 978-1-4799-8182, IEEE.

J. Norman et al., "Ultrasonic Dry Coupling Through Tissue", Journal of the Canadian Acoustical Association, 2015, vol. 43, No. 3.

S. Ozeri et al., "Ultrasonic transcutaneous energy transfer for powering implanted devices", Ultrasonics, 2010, p. 556-566, vol. 50, Elsevier.

S. Ozeri et al., "Simultaneous backward data transmission and power harvesting in an ultrasonic transcutaneous energy transfer

(56) References Cited

OTHER PUBLICATIONS link employing acoustically dependent electric impedance modulation", Ultrasonics, 2014, p. 1929-1937, vol. 54, Elsevier.

M. Peisino, "Deeply implanted medical device based on a novel ultrasonic telemetry technology", École Polytechnique Federale de Lausanne, 2013, These No. 5730.

A.F. Prokop et al., "Polyacrylamide Gel as an Acoustic Coupling Medium for Focused Ultrasound Therapy", Ultrasound in Med. & Biol., 2003, pp. 1351-1358, vol. 29, No. 9, Elsevier.

L. Radziemski et al., "In vivo demonstration of ultrasound power delivery to charge implanted medical devices via acute and survival porcine studies", Ultrasonics, 2016, p. 1-9, vol. 64, Elsevier.

S. Suzuki et al., "Fundamental study of an electric power transmission system for implanted medical devices using magnetic and ultrasonic energy", J Artif Organs, 2003, p. 145-148, vol. 6., The Japanese Society for Artificial Organs.

B. Yochev et al., "Investigation of Ultrasonic Properties of Hydrophilic Polymers for Dry-coupled Inspection", ECNDT, Technical University—Sofia, Bulgaria, 2006, p. 1-10.

Kang et al., "Closed Loop Liquid Cooling for High Performance Computer Systems," Proceedings of IPACK2007, ASME InterPACK '07, Jul. 8-12, 2007, Vancouver, British Columbia, Canada (7 pgs).

Franco et al., "Advanced Therapy in Cardiac Surgery," PMMMPH USA, Second Edition, Apr. 2003 (book description only).

PCT International Search Report and the Written Opinion issued in application No. PCT/US2013/020577, dated Mar. 11, 2013.

Park et al., "Crystal Growth and Ferroelectric Related Properties of . . . ", IEEE, 1996, pp. 79-82.

"Material properties of PZN-8% PT Single Crystal," PennState, 1 page.

"Material properties of PMN-33% PT Single Crystal," PennState, 1 page.

Yang et al., "Extensional vibration of a nonuniform piezoceramic rod and high voltage generation," International Journal of Applied Electromagnetics and Mechanics IOS Press, 2000, 7 pages.

Shen et al., "Design of Ceramic Packages for Acoustically Coupled Implantable Medical Devices," IEEE BME, Nov. 11, 2019.

Seo et al., "Wireless Recording in the Peripheral Nervous System with Ultrasonic Neural Dust," Neuron 91, 529-539, Aug. 3, 2016, Elsevier Inc.

Slaughter et al., "Transcutaneous Energy Transmission for Mechanical Circulatory Support Systems: History, Current Status, and Future Prospects," J Card Surg, 2010, vol. 25, pp. 484-489.

Mallela et al., "Trends in Cardiac Pacemaker Batteries," Indian Pacing and Electrophysiology Journal Technical Series, (ISSN 0972-6292), 4(4): 201-212 (2004).

\* cited by examiner

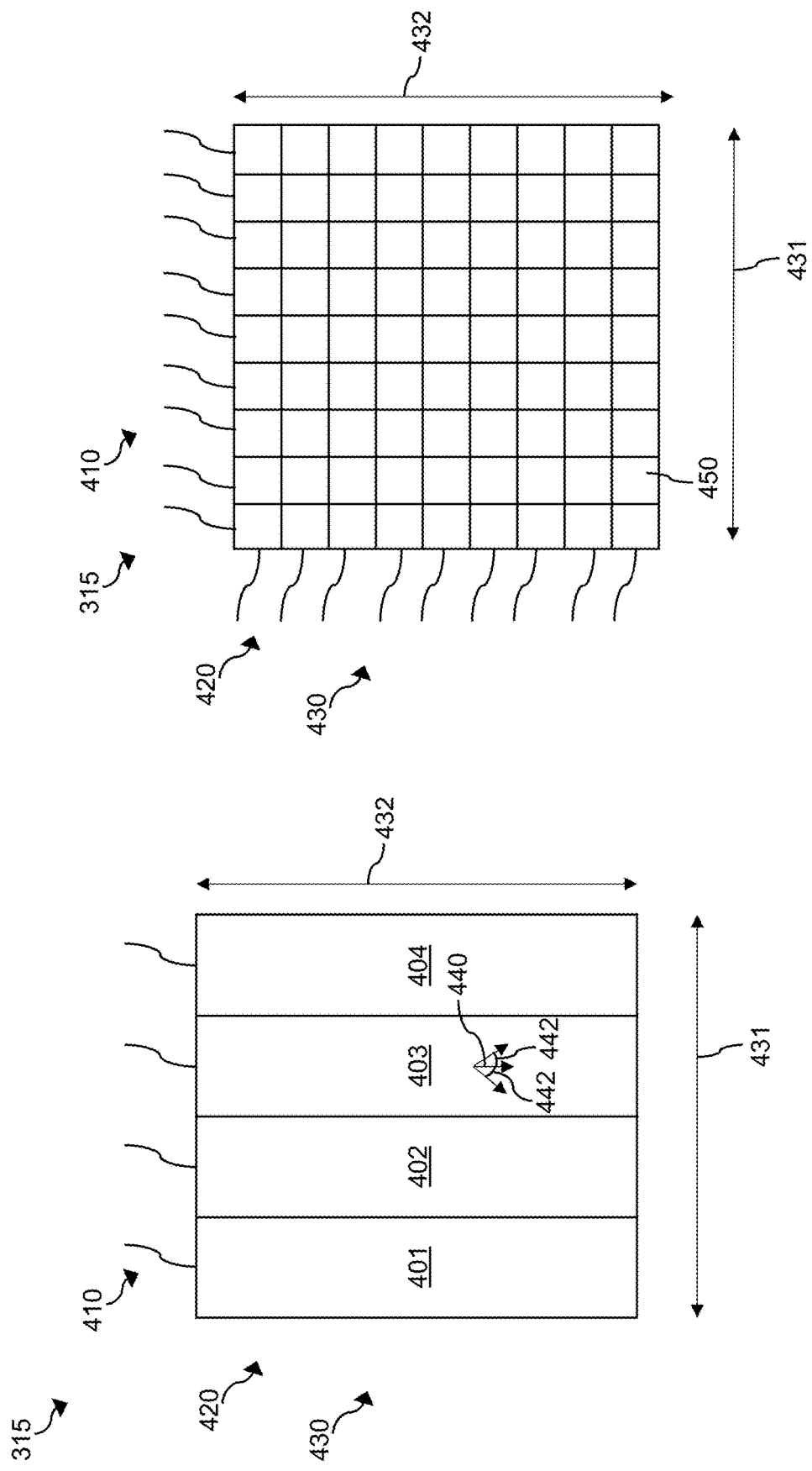

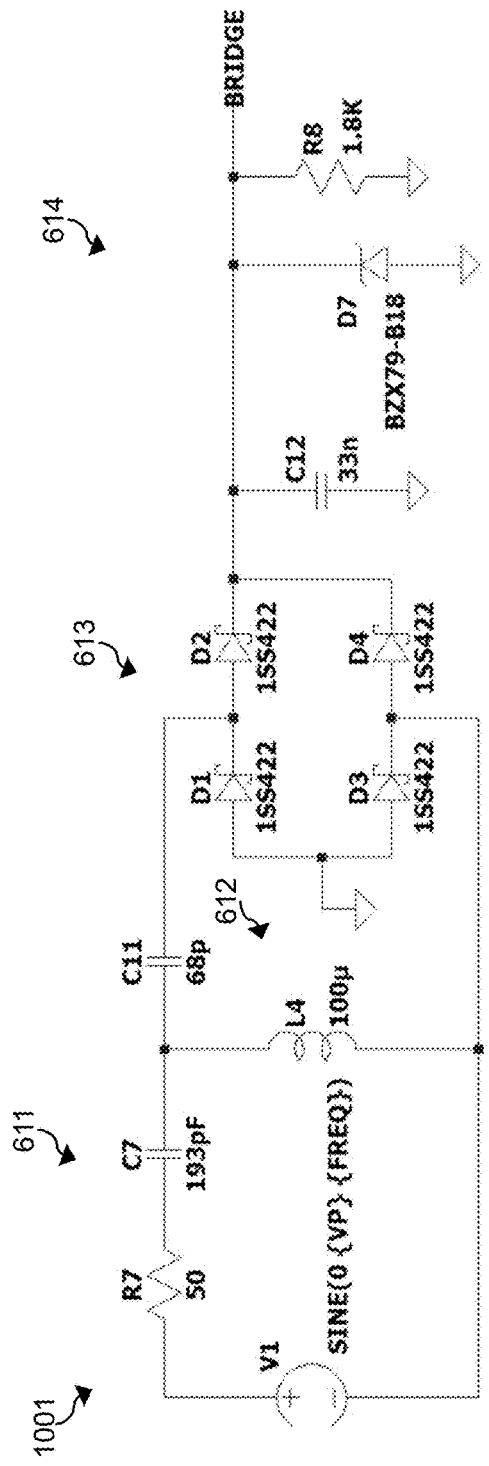
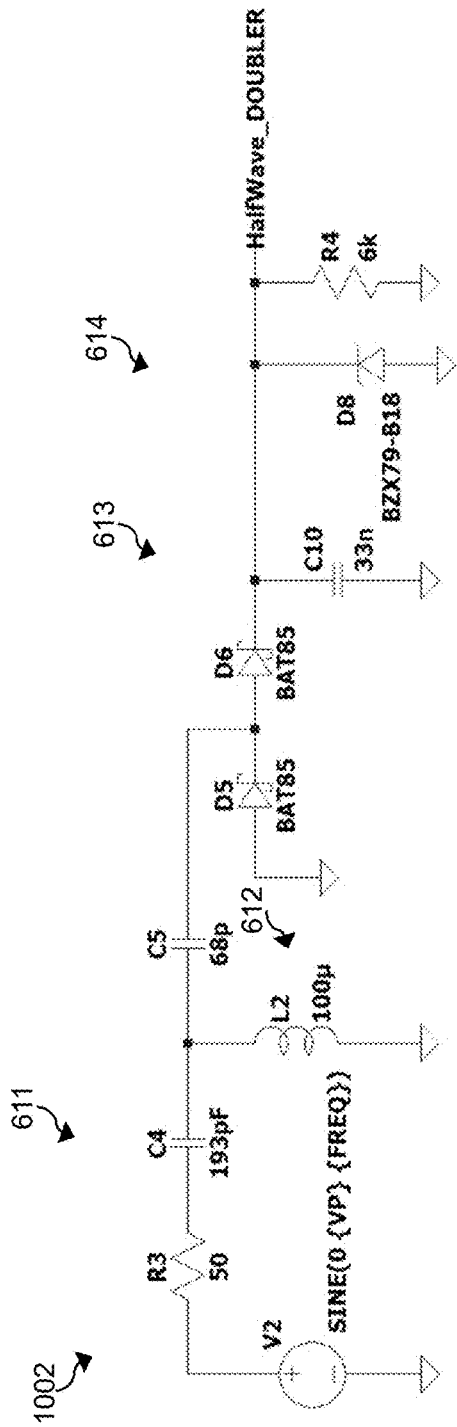
FIG. 10A
FIG. 10B

SYSTEM AND METHOD FOR POWERING AN IMPLANTABLE DEVICE USING ACOUSTIC ENERGY

CROSS-REFERENCE TO RELATED APPLICATIONS

This application claims priority to U.S. Provisional Application No. 63/496,090, titled "Implantable Spot-Size Ultrasound System for In Situ Wireless Power Transfer," filed on Apr. 14, 2023, which is hereby incorporated by reference.

TECHNICAL FIELD

This application relates generally to wireless transfer of power using acoustic energy.

BACKGROUND

Implants are constantly being miniaturized in order to be placed within the body, to supplement a physiologic function, stimulate neurogenic tissue, activate specific receptors, or initiate the pharmacologic response of chemical formulations. Miniaturization enables ease of introduction, reduced discomfort, and less risk of complications from the implant.

Implants in general can be active (e.g., active implantable medical devices (AIMD)), or passive systems. Active implantable devices require a power source such as a primary (single use) or secondary (rechargeable) battery to functionalize the system. The current trend for powering AIMDs is to use secondary batteries. The rechargeable battery can be replenished wirelessly, using an external power source. For passive implants, powering of the systems is accomplished by a power source external to the body. Through wireless power transfer, the target device is activated on an as-needed basis, or it is operated continuously. Current wireless powering is achieved using electro-magnetic fields or ultrasound beams. Active or passive miniaturized implants require charging or powering the implant at significant depth, localization and alignment with transmitter, wide angle of acceptance for powering the implant, ability to power small batteries, including solid-state batteries (SSB), which might require rapid and frequent charging, and delivery of power through metallic, or non-metallic hermetically sealed enclosures.

Although the list of requirements above is not exhaustive, there are currently significant unmet needs in fulfilling some or all of the above requirements to power miniaturized implants. Existing non-ultrasound based energy transfer systems, such as using electromagnetic (EM) energy, are limited in their capability to deliver energy greater than a few centimeters due to radial spreading and absorption. Further, with such systems, it is not practical to steer the transmit beam for electro-magnetic energy sources due to the several meters-long wavelengths at current operating frequencies.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages, and novel features of the disclosure will be set forth in the following detailed description of the disclosure when considered in conjunction with the drawings, which are intended to illustrate, not limit, the invention.

An aspect of the invention is directed to a method comprising: acoustically coupling an acoustic transmitter to an external surface of a mammal at an approximate location of an implantable device disposed in the mammal; producing, with the acoustic source, acoustic energy having a frequency in a frequency range of about 0.5 MHz to about 3 MHz; receiving the acoustic energy with one or more transducers in the implantable device, the one or more transducers electrically connected to an electric circuit, the one or more transducers having a length in a length range of about 1 wavelength to about 10 wavelengths of the acoustic energy; converting, with the one or more transducers, the acoustic energy to electric energy; and providing the electric energy to a device electrically connected to the electric circuit.

In one or more embodiments, the implantable device is located in a range of about 50 mm to about 140 mm from the external surface of a mammal. In one or more embodiments, the one or more transducers convert the acoustic energy to an alternating current (AC) electric energy, and the method further comprises: converting, with a rectifier in the electric circuit, the AC electric energy to a direct current (DC) electric energy; and providing the DC electric energy to the device.

In one or more embodiments, the device comprises a battery, and the method further comprises charging the battery with the DC electric energy. In one or more embodiments, the device comprises a sensor, and the method further comprises powering the sensor with the DC electric energy.

In one or more embodiments, the acoustic transmitter includes a plurality of transmitting ultrasound transducers, and the method further comprises: measuring, with a first motion processing circuit (MPC) in the implantable device, a first three-dimensional position of the implantable device; measuring, with a second MPC in the acoustic transmitter, a second three-dimensional position of the acoustic transmitter; wirelessly sending the first three-dimensional position from the implantable device to the acoustic transmitter; and determining, with the second MPC, an alignment of the implantable device and the acoustic transmitter; and when the alignment is higher than or equal to a lower alignment threshold and less than an upper alignment threshold, automatically adjusting a relative phase of one or more of the transmitting ultrasound transducers to electronically steer the acoustic energy to reduce an incidence angle of the acoustic energy at the implantable device compared to when no electronic steering is performed. In one or more embodiments, the method further comprises when the alignment is higher than or equal to the upper alignment threshold, producing an output signal indicating a direction to physically move the acoustic transmitter.

Another aspect of the invention is directed to a system comprising: an acoustic transmitter including a first housing; and one or more transmitting acoustic transducers disposed in the first housing, the one or more transmitting acoustic transducers configured to produce acoustic energy having a frequency in a frequency range of about 0.5 MHz to about 3 MHz; and an implantable device configured to be implanted in a mammal, the implantable device including a second housing; one or more receiving acoustic transducers disposed in the second housing, the one or more transducers having a length in a length range of about 1 wavelength to about 10 wavelengths of the acoustic energy, the one or more receiving acoustic transducers configured to convert the acoustic energy to electric energy; and a device electrically coupled to the one or more receiving acoustic transducers to receive the electric energy, the device disposed in the second housing.

In one or more embodiments, the implantable device is configured to be implanted in a range of about 50 mm to about 140 mm from an external surface of the mammal. In one or more embodiments, the one or more receiving acoustic transducers is/are configured to convert the acoustic energy to an alternating current (AC) electric energy, and the one or more receiving acoustic transducers is/are electrically connected to a circuit that includes a rectifier that converts the AC electric energy to a direct current (DC) electric energy; and a power management circuit electrically coupled to an output of the rectifier, the power management circuit configured to provide the DC electric energy to the device. In one or more embodiments, the device comprises a battery.

In one or more embodiments, the implantable device further includes a first motion processing circuit (MPC) configured to measure a first three-dimensional position of the implantable device; and a first communications circuit electrically connected to the first MPC; and the acoustic transmitter further includes a second MPC configured to measure a second three-dimensional position of the acoustic transmitter; and a second communications circuit electrically connected to the second MPC, wherein the first communications circuit is configured to send the first three-dimensional position to the second communications circuit, the second communications circuit is configured to provide the first three-dimensional position to the second MPC, and the second MPC is configured to determine an alignment of the acoustic transmitter and the implantable device using the first and second three-dimensional positions.

In one or more embodiments, the second MPC is configured to compare the alignment with lower and upper alignment thresholds, when the alignment is higher than or equal to a lower alignment threshold and less than an upper alignment threshold, produce an output signal causes a relative phase of one or more of the transmitting ultrasound transducers to be adjusted so as to electronically steer the acoustic energy to reduce an incidence angle of the acoustic energy at the implantable device compared to when no electronic steering is performed, and when the alignment is higher than or equal to the upper alignment threshold, produce an output signal indicating a direction to physically move the acoustic transmitter.

In one or more embodiments, an acoustic aperture of the one or more transmitting acoustic transducers is greater than about 10 wavelengths of the acoustic energy. In one or more embodiments, the implantable device further includes a first motion processing circuit (MPC) configured to measure a first three-dimensional position of the implantable device; and a first communications circuit electrically connected to the first MPC; and the acoustic transmitter further includes a second MPC configured to measure a second three-dimensional position of the acoustic transmitter; and a second communications circuit electrically connected to the second MPC, wherein the first communications circuit is configured to send the first three-dimensional position to a computer, the second communications circuit is configured to send the second three-dimensional position to the computer, and the computer is configured to determine an alignment of the acoustic transmitter and the implantable device using the first and second three-dimensional positions.

Another aspect of the invention is directed to a system comprising: an acoustic transmitter including a first housing; and one or more transmitting acoustic transducers disposed in the first housing, the one or more transmitting acoustic transducers configured to produce acoustic energy having a frequency in a frequency range of about 0.5 MHz to about 3 MHz; and an implantable apparatus configured to be implanted in a mammal, the implantable apparatus including a plurality of implantable transducers, each implantable transducer enclosed in a respective housing and configured to convert the acoustic energy to an alternating current (AC) electric energy; an implantable electric device including a plurality of rectifier circuits, each rectifier circuit having a respective input that is electrically connected to a respective implantable transducer and configured to convert the AC electric energy to a direct current (DC) electric energy; a power management circuit having an input electrically connected to a respective output of each rectifier circuit; and a device electrically connected to an output of the power management circuit to receive DC power therefrom.

In one or more embodiments, the implantable transducers are configured to be implanted at different physical locations in the mammal to improve a likelihood of an alignment between the acoustic transmitter and at least one of the implantable transducers compared to when the implantable apparatus only includes one implantable transducer. In one or more embodiments, the implantable electric device includes a receiving acoustic transducer that is electrically connected to one of the rectifier circuits. In one or more embodiments, the power management circuit is configured to add a DC voltage output from each rectifier circuit.

BRIEF DESCRIPTION OF THE DRAWINGS

For a fuller understanding of the nature and advantages of the concepts disclosed herein, reference is made to the detailed description of preferred embodiments and the accompanying drawings.

FIG. 4A is a top view of the transducer(s) illustrated in FIG. 3 according to an embodiment.

FIG. 4B is a top view of the transducer(s) illustrated in FIG. 3 according to another embodiment.

FIGS. 10A and 10B are circuit diagrams of equivalent circuits for the energy-harvesting circuit illustrated in FIG. 6 according to various embodiments

DETAILED DESCRIPTION

An acoustic transmitter is acoustically coupled to a surface near an region of interest where an implantable device is located. The acoustic transmitter is configured to produce acoustic energy at a frequency in the range of about 0.5 MHz to about 3 MHz. The implantable device includes one or more receiving transducers that is/are configured to convert the acoustic energy to alternating current (AC) electric energy which is provided to a device through an electric circuit. The electric circuit can include a rectifier that converts the AC electric energy to DC electric energy and/or a power-management circuit that regulates the electric energy and selectively provides the electric energy to the device, for example to charge a battery or a capacitor or operate a sensor or another device The battery can be electrically connected to another device, for example in an anatomical region where the implantable device is located.

Positioning circuitry in the acoustic transmitter and in the implantable device can be used to align the acoustic transmitter and in the implantable device, such as through electronic steering of the acoustic energy by the acoustic transmitter or by physically moving the acoustic transmitter. The receiving transducer(s) have a length and/or a width that is in a range of about 1 wavelength to about 10 wavelengths of the acoustic energy produced by the acoustic transmitter, which can provide for a wide angle of acceptance.

In some embodiments, multiple receiving transducers can be implanted at different locations in the mammal (e.g., in an anatomical region of interest) to provide spatial diversity and to improve the likelihood of alignment between at least one of the receiving transducers and the acoustic transmitter.

Figure 1:
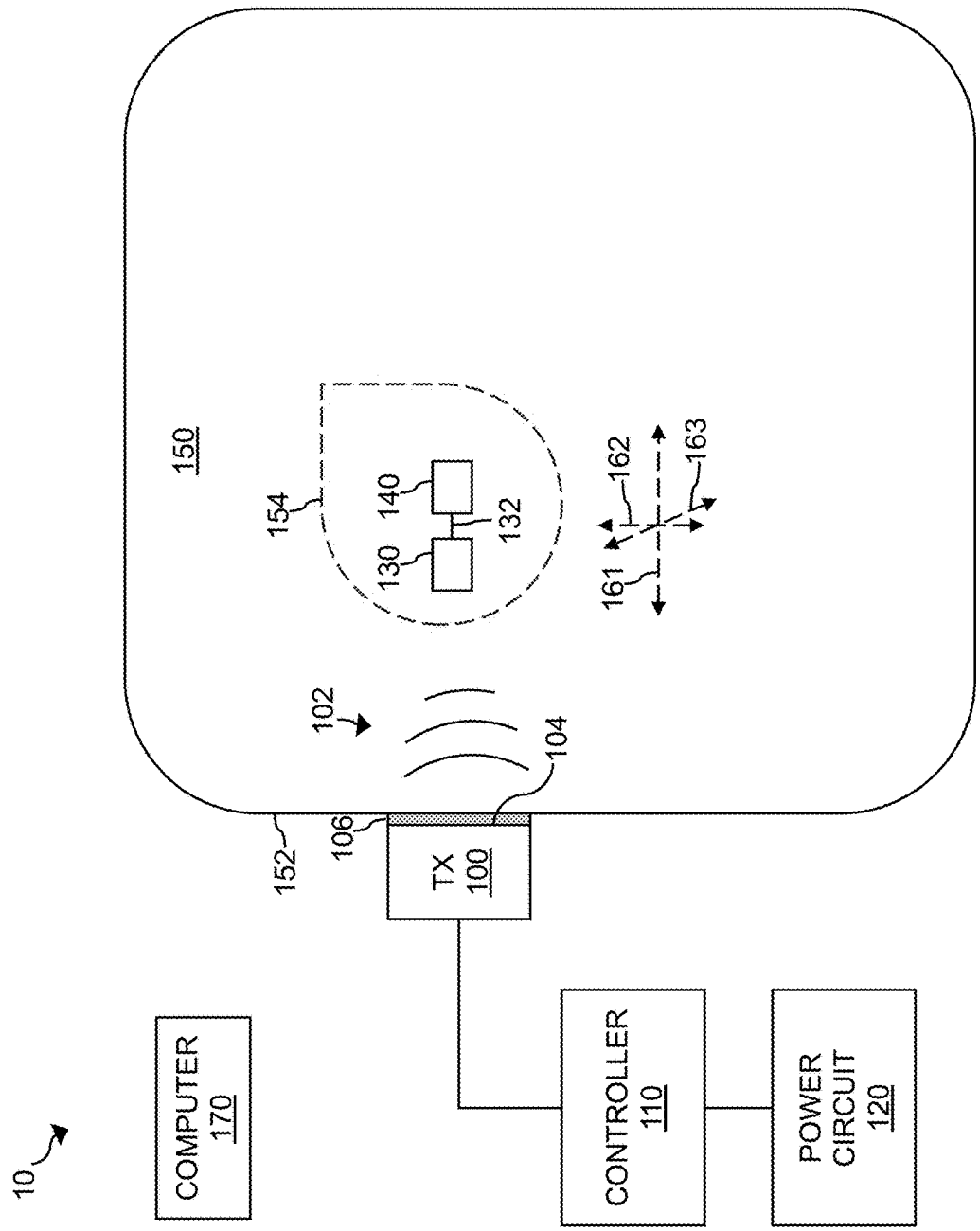
FIG. 1 is a block diagram of a system for providing electrical energy to a device located in a mammal according to an embodiment.

FIG. 1 is a block diagram of a system 10 for providing electrical energy to a device located in a mammal according to an embodiment. The system 10 includes an acoustic transmitter 100, a controller 110, a power circuit 120, and an implantable device 130.

The acoustic transmitter 100 includes one or more transducers that can produce acoustic energy 102, such as ultrasound energy, in response to control signals sent from the controller 110. The power circuit 120 can provide electrical energy for the acoustic transmitter 100, such as from a power supply or from an electrical outlet. In some embodiments, the acoustic transmitter 100, the controller 110, and/or the power circuit 120 can be combined.

The acoustic energy 102 can have a frequency of about 0.5 MHz to about 3 MHZ, including about 1 MHz, about 1.5 MHz, about 2 MHZ, about 2.5 MHz, and/or any value or range between any two of the foregoing values. As used herein, "about" means plus or minus 10% of the relevant value. In some embodiments, the acoustic transmitter 100 is a narrowband acoustic transmitter that is configured (e.g., tuned) to produce acoustic energy in a narrow frequency range such as at a center frequency plus or minus about 0.1 MHz. For example, a narrowband acoustic transmitter with a center frequency of 1 MHz can produce acoustic energy in a narrowband range of about 0.9 MHz to about 1.1 MHz. Alternatively, the acoustic transmitter 100 can be a broadband acoustic transmitter that is configured (e.g., tuned) to produce acoustic energy in an asymmetric broadband frequency range, such as about 0.5 MHz to about 3 MHZ, about 1 MHz to about 2 MHz, or another frequency range. For example, a broadband acoustic transmitter can have a center frequency of 1 MHz and a frequency range of about 30% to about 200% of the center frequency.

The frequency of the acoustic energy 102 can correspond to a depth range for the implantable receiver. In general, acoustic energy 102 having a lower frequency can be transmitted further (deeper) into a mammal 150 compared to acoustic energy 102 having a higher frequency. Conversely, acoustic energy 102 having a higher frequency can be transmitted shallower (less deep) into a mammal 150 compared to acoustic energy 102 having a lower frequency. As an example case, at 1 MHz, the useful power transfer depth can be up to about 110 mm in tissue.

In operation, the acoustic transmitter 100 is acoustically coupled to a surface at or near a region or volume of interest. For example, the acoustic transmitter 100 is acoustically coupled to an external surface 152 of a mammal 150 such as to the skin of a human. The acoustic transmitter 100 can be placed in direct physical contact with the external surface. Alternatively, an acoustic transmission medium 106, such as an acoustic gel or a dry-coupling material, can be in placed between and in direct physical contact with the acoustic transmitter 100 and the external surface 152 of the mammal 150. Examples of the acoustic transmission medium 106 include hydrophilic, lipophilic, or materials with an adhesive characteristic. For example, the acoustic transmission medium 106 can include silicone, polyurethane, plastisol, polyetherimide, Aqualene™ (available from Innovation Polymers), AquaSilox™ (available from Innovation Polymers), and/or another material.

The acoustic transmitter 100 can produce acoustic energy 102 to form images of the implantable device 130 and/or of surrounding anatomical features such as anatomical feature 154. For example, time-gated pulse-echo signals and/or 2-D image data can be used as feedback to position and/or align the acoustic transmitter 100 relative to the implantable device 130.

The implantable device 130 includes one or more transducers that is/are configured to receive and convert the acoustic energy 102 to electric energy. The electrical energy can be transmitted through an electrical circuit in the implantable device 130 to a device on or in the implantable device 130. The device can include a sensor, a medical device such as a laser and/or an electrode (e.g., a neurostimulator), and/or another device. Additionally or alternatively, the device can include one or more energy accumulation devices and/or one or more energy storage devices such as one or more capacitors, one or more inductors, and/or one or more batteries. In some embodiments, the electrical energy can be transmitted directly or indirectly to another device 140 that is electrically connected to the implantable device. For example, the electrical circuit, the energy accumulation device(s), and/or the energy storage device(s) in the implantable device 130 can be electrically connected to the device 140 through one or more wires 132.

The implantable device 130 can be introduced or implanted in an anatomical feature 154 at a predetermined distance from the external surface 152 of a mammal 150, such as from the skin of a human. The anatomical feature 154 can comprise an organ, a nerve, a blood vessel, a bone, the brain, and/or another anatomical feature. The predetermined distance can be measured with respect to a first axis 161 that is orthogonal to the external surface 152 and/or to a side 104 of the acoustic transmitter 100 that is disposed on or adjacent to the external surface 152. The predetermined distance can be about 50 mm to about 140 mm including about 75 mm, about 100 mm, about 120 mm, and any value or range between any two of the foregoing values.

The implantable device 130 can have one or more dimensions that correspond to the wavelength of the acoustic energy 102 produced by the acoustic transmitter 100. For example, a length and/or a width of the implantable device 130 (e.g., of the receiver acoustic transducer) can correspond to the wavelength of the acoustic energy 102. The length and/or the width can be in the range of about 1 wavelength to about 10 wavelengths of the acoustic energy 102, including about 2 wavelength, about 4 wavelengths, about 6 wavelengths, about 8 wavelengths, and any value or range between any two of the foregoing values. For example a 3 mm diameter, 2 wavelength receiver acoustic transducer can have a volume as small as 1.5 $mm^3$. The wavelength of the acoustic energy 102 in the mammal 150 can be modeled based on the measured speed of sound in water at 25° C. (i.e., 1480 m/s).

In the orientation of the implantable device 130 shown in FIG. 1, the length can be measured with respect to the first axis 161, and the width can be measured with respect to a second axis 162 that is orthogonal to the first axis. A plane defined by the first and second axes 161, 162 can be parallel to the aperture of the transducer(s) in the implantable device 130. A thickness of the implantable device 130 can be measured with respect to a third axis 163 that is orthogonal to the first and second axes 161, 162.

Figure 2:
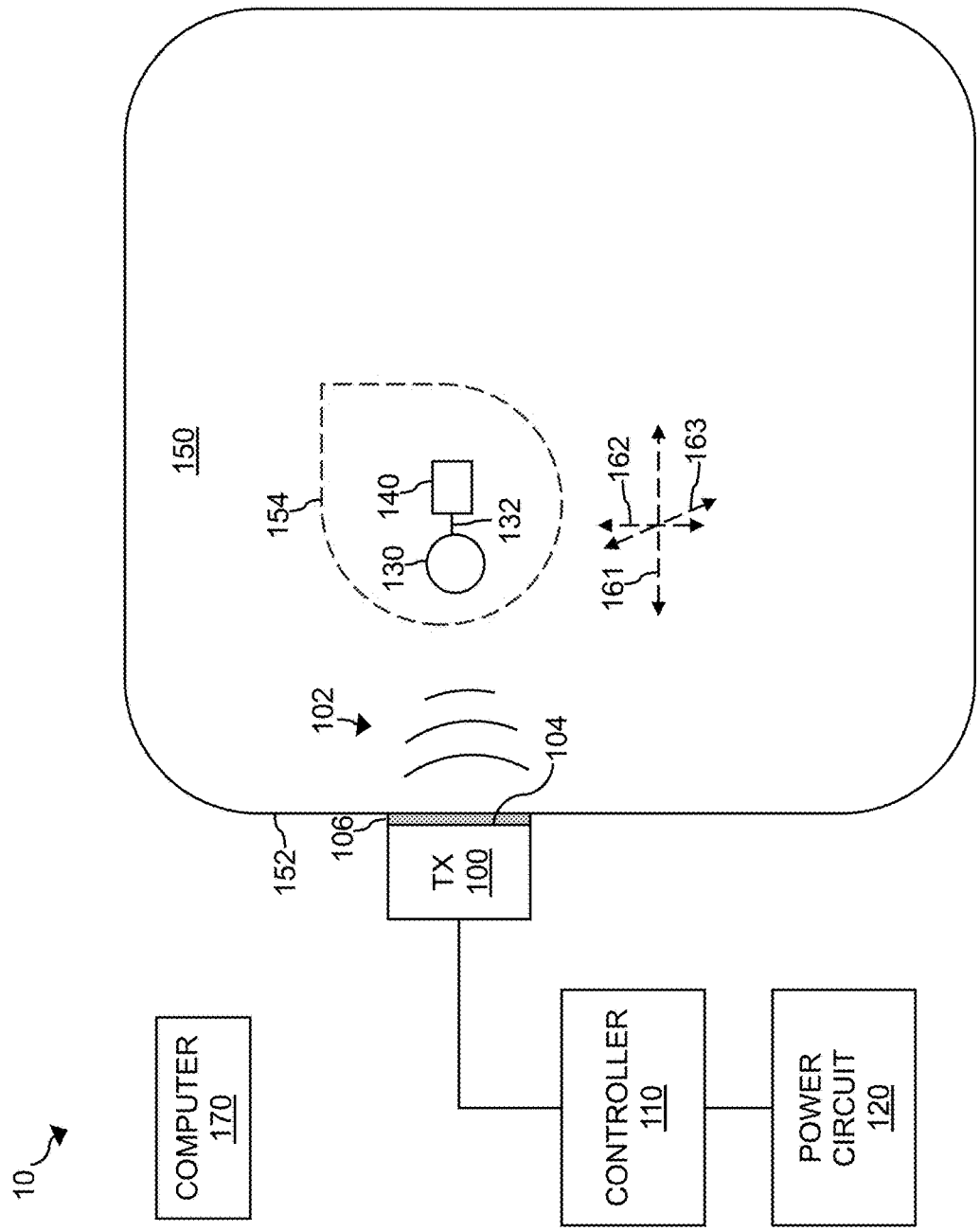
FIG. 2 is a block diagram of a system for providing electrical energy to a device located in a mammal according to another embodiment.

In another embodiment, the implantable device 130 can be spherical or cylindrical in shape in which case a diameter of the implantable device 130 can be measured with respect to the first axis 161 and/or with respect to the second axis 162, for example as illustrated in FIG. 2. The diameter can be in the range of about 1 wavelength to about 10 wavelengths of the acoustic energy 102, including about 2 wavelength, about 4 wavelengths, about 6 wavelengths, about 8 wavelengths, and any value or range between any two of the foregoing values.

In an embodiment, the volume of the implantable device 130 can be about 1 $mm^3$ to about 200 $mm^3$, including about 50 $mm^3$, about 100 $mm^3$, about 150 $mm^3$, and any value or range between any two of the foregoing values. In another embodiment, the volume of the implantable device 130 can be about 200 $mm^3$ to about 2,000 $mm^3$, including about 500 $mm^3$, about 1,000 $mm^3$, about 1,500 $mm^3$, and any value or range between any two of the foregoing values. In another embodiment, the volume of the implantable device 130 can be about 1 $mm^3$ to about 2,000 $mm^3$, including about 500 $mm^3$, about 1,000 $mm^3$, about 1,500 $mm^3$, and any value or range between any two of the foregoing values. In some embodiments, an implantable device 130 having a larger volume (e.g., about 200 $mm^3$ to about 2,000 $mm^3$) can be implanted more superficially in tissue, for example, less than about 40 mm deep compared to an implantable device 130 having a smaller volume (e.g., about 1 $mm^3$ to about 200 $mm^3$).

Figure 3:
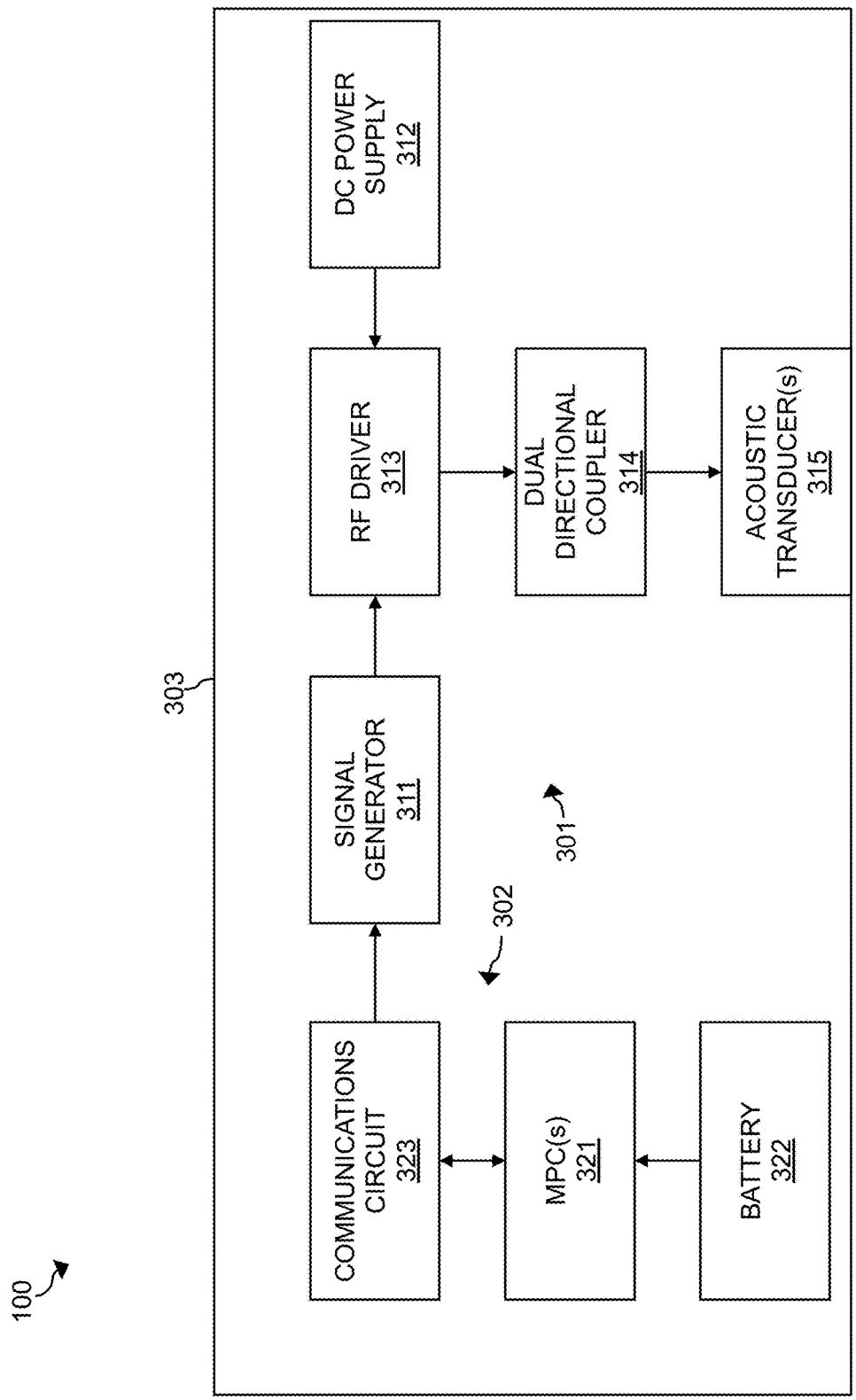
FIG. 3 is a block diagram of the acoustic transmitter illustrated in FIGS. 1 and 2 according to an embodiment.

FIG. 3 is a block diagram of the acoustic transmitter 100 according to an embodiment. The acoustic transmitter 100 includes an acoustic energy circuit 301, a motion processing circuit 302, and a housing 303. The acoustic energy circuit 301 and the motion processing circuit 302 are disposed in the housing 303.

The acoustic energy circuit 301 is configured to produce the acoustic energy 102. The acoustic energy circuit 301 includes a signal generator 311, a DC power supply 312, a radio-frequency (RF) driver 313, a dual-directional coupler 314, and one or more acoustic transducers 315. The signal generator 311 is configured to produce an oscillating signal at a frequency equal or corresponding to the frequency of the acoustic energy 102. The signal generator 311 can be configured to use direct digital synthesis or another method to create the oscillating signal. The oscillating signal from the signal generator 311 and DC power produced by the DC power supply 312 are input to the RF driver 313 includes amplifiers to produce high-frequency (e.g., RF) output signals that are configured to drive the transducer(s) 315. The DC power supply 312 and the RF driver 313 can be separate components or integrated into a standalone device. The RF driver 313 can also adjust the relative phase(s) of one or more high-frequency output signals to electronically steer the acoustic energy 102. The DC power supply 312 can be a variable DC power supply, for example from 0V to 12V. The DC power supply 312 can comprise a battery. Alternatively, the DC power supply 312 can comprise a rectifier to covert AC power from the power circuit 120 into DC power.

The high-frequency output signals from the RF driver 313 are coupled to the transducer(s) 315 using the dual-directional coupler 314, which can include inductors and/or capacitors for impedance matching. Some or all of the components of the acoustic energy circuit 301 can be mounted on a printed circuit board (PCB), which can have dimensions of about 50 mm×about 50 mm and a height of about 20 mm. The transducer(s) 315 can comprise piezocomposite materials, PbNiO3, Pb—Ni-Niobate, polyvinylidene fluoride (PVDF), cMUT (Capacitive Micro-machined Ultrasound Transducers), pMUT (Piezoelectric Micro-machined Ultrasound Transducers), or other electromechanical materials, or combinations thereof. Micromachined-based transducers have the advantage that all the drive and circuitry can be fabricated on the same silicon chip.

For driving a single-element acoustic transmitter 100, the acoustic energy circuit 301 can include multiple stages including: frequency control (e.g., signal generator 311), a microcontroller—with control interface built in proximity with the microcontroller, selectively located on the same PCB as other components, an RF power stage (e.g., RF driver 313), a switchmode DC power supply (e.g., DC power supply 312) to control output power, and a matching L network (e.g., dual directional coupler 314). The RF power stage can be driven using a Class-E circuit or a Class-D circuit. Using a Class-E circuit or a Class-D circuit, the power transistor can be operated in a such a way that the voltage and current can be phase-shifted to minimize power dissipation during switching. In addition, capacitive losses at transistor turn-on can be minimized by maintaining the voltage at zero at that timepoint for switching. Finally, with a closed-loop monitor to track frequency shifts at the piezo-electric transmitter powerpac function is optimized. Based on rising trend for reverse power, the frequency can be adaptively shifted to maximize acoustic power drive from the acoustic transmitter 100.

Similar drive circuitry can be designed for 1-D or a 2-D array of transducers 315 with compact form factor of about 75 mm diameter (e.g., as an example), or a rectangular form factor of about 80×40 mm. The drive circuitry can be battery powered or AC powered (e.g., in which case a rectifier is included to convert the AC to DC). In some embodiments, the transducers 315 can include multiple single element transducers placed on the body, individually directed towards the zone of maximum receiver sensitivity.

The motion processing circuit 302 includes one or more motion processing units (MPUs) 321, one or more batteries 322, and a communication circuit 323. An MPU 321 can alternately be referred to as a motion processing circuit or motion processing circuitry.

The MPU(s) 321 is/are electrically connected to one or more batteries 322. The MPU(s) 321, for example an MPU-9250 available from TDK InvenSense, includes one or more spatial determining and/or motion sensing functionalities, which can be implemented as circuits (e.g., integrated circuits including a system-on-a-package and/or a system-on-a-chip) and/or as microprocessors. The MPUs 321 can alternatively be referred to as motion processing circuits. The MPU-9250, for example, has a form factor of 3 mm×3 mm×1 mm. The MPU(s) 321 can have built-in functionality for an accelerometer, a goniometer, a magnetometer, a gyroscope, and/or another position-sensing means. MPU(s) 321 can be used to determine the three-dimensional position and orientation of the implantable device 130 and/or the relative three-dimensional position and orientation of the implantable device 130 with respect to the acoustic transmitter 100. Data from the MPU(s) 321 can be transmitted externally, such as to a computer or processor, using a communications circuit 323 that is electrically connected to the output of the MPU(s) 321. Additionally or alternatively, the communications circuit 323 can receive MPU data from the implantable device 130. The communications circuit 323 can comprise a near-field communications circuit, a cellular communications circuit, a local communications circuit (e.g., a Bluetooth communications circuit), a Medical Implant Communications System (MICS) (e.g., 405 MHZ), and/or a WiFi communications circuit. The communications circuit 323 includes an antenna to broadcast wireless signals that represent the MPU data. Additionally or alternatively, the communications circuit 323 can include an ultrasound communication circuit.

FIG. 4A is a top view of the transducer(s) 315 according to an embodiment. In this embodiment, the transducer(s) 315 include 4 transducer elements 401-404. An electrical wire or lead 410 is electrically connected to each transducer element 401-404 to allow each transducer element 401-404 to be driven independently. Thus, the relative phase of the driving signals for each transducer element 401-404 can be controlled to electronically steer the acoustic energy 102. In other embodiments, there can be additional or fewer transducer elements.

The dimensions of acoustically active regions 420 of the transducer(s) 315 define an acoustic aperture 430 of the transducer(s) 315. The transducer elements 401-404 and the active regions 420 are planar and have an acoustic aperture 430 defined by (or corresponding to) a length 431 and a width 432 of the transducer elements 401-404 and/or of the transducer(s) 315. The acoustic aperture 430 is larger than about 10 wavelengths of the acoustic energy 102. The source dimensions >> wavelength enables the radiated ultrasound field (e.g., acoustic energy 102) to be directive.

The transducer elements 401-404 represent a one-dimensional array. In some embodiments, the transducer(s) 315 can comprise a two-dimensional array of transducer elements 450, for example as illustrated in FIG. 4B. Electrical wires or leads can be electrically connected to each column and/or to each row of transducer element 450 so as to independently control each transducer element 450. The acoustically active regions 420 of the transducer elements 450 define an acoustic aperture 430 that is larger than about 10 wavelengths of the acoustic energy 102.

In other embodiments, the transducer(s) 315 can be other shapes, such as circular or polygonal, and/or can be convergent or weakly divergent.

Figure 5B:
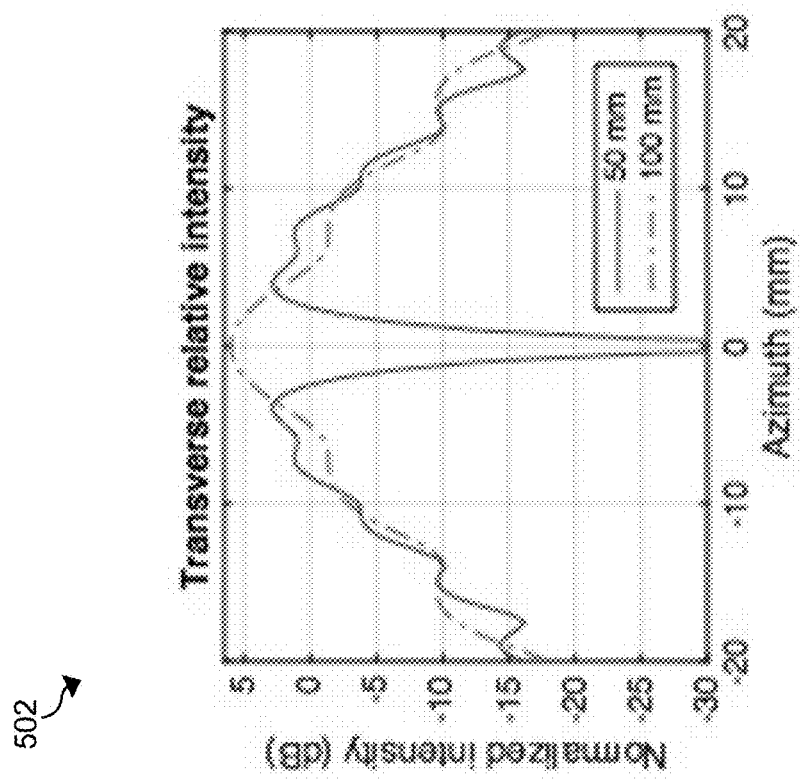
FIGS. 5A and 5B are example graphs of the normalized intensity of an example beam of acoustic energy produced by the acoustic transmitter illustrated in FIGS. 1 and 2.
Figure 5A:
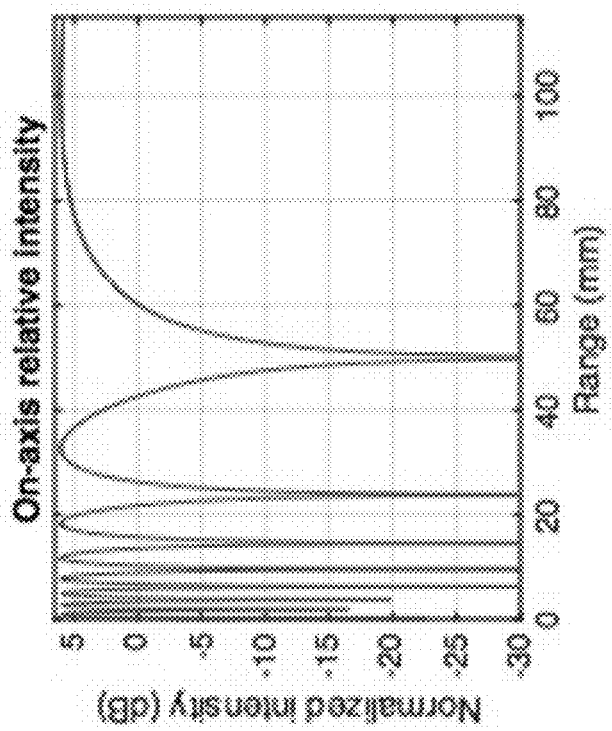

FIGS. 5A and 5B are graphs 501, 502 of the normalized intensity of an example beam of the acoustic energy 102 produced by a circular transducer(s) 315. Graph 501 illustrates the normalized acoustic intensity along the beam axis, which is orthogonal to the planar surface of a circular disk transducer(s) (e.g., orthogonal to the disk surface), with acoustic energy 102 produced at 1 MHz with a transducer 315 having a 25 mm diameter and as measured with an implantable device 130 submerged in water or saline. As can be seen, the normalized intensity includes several local minimums between a distance (range) of 0 mm to about 50 mm from the transducer(s) 315. From about 50 mm to about 120 mm, the normalized intensity remains high, which indicates that significant energy from the acoustic energy 102 can be received at equivalent depths in a mammal.

Graph 502 illustrates the numerically calculated normalized intensity of the acoustic energy 102 in a traverse direction from the beam axis of a circular disk, as measured with the implantable device 130 submerged in water. The traverse direction is orthogonal to the beam axis and can be parallel to an ultrasound radiating disk. A first series of numerical results were obtained at a distance of 50 mm, with estimates along the beam axis, from the transducer(s) 315. A second series of estimates were made at a distance of 100 mm, measured along the beam axis, from the transducer(s) 315. As can be seen, the normalized intensity is relatively high within 20 mm of the beam axis (0 mm in FIG. 5B) indicating a collimated beam, which can uniformly (or substantially uniformly) irradiate the significantly smaller dimensions of the implantable device 130.

Figure 6:
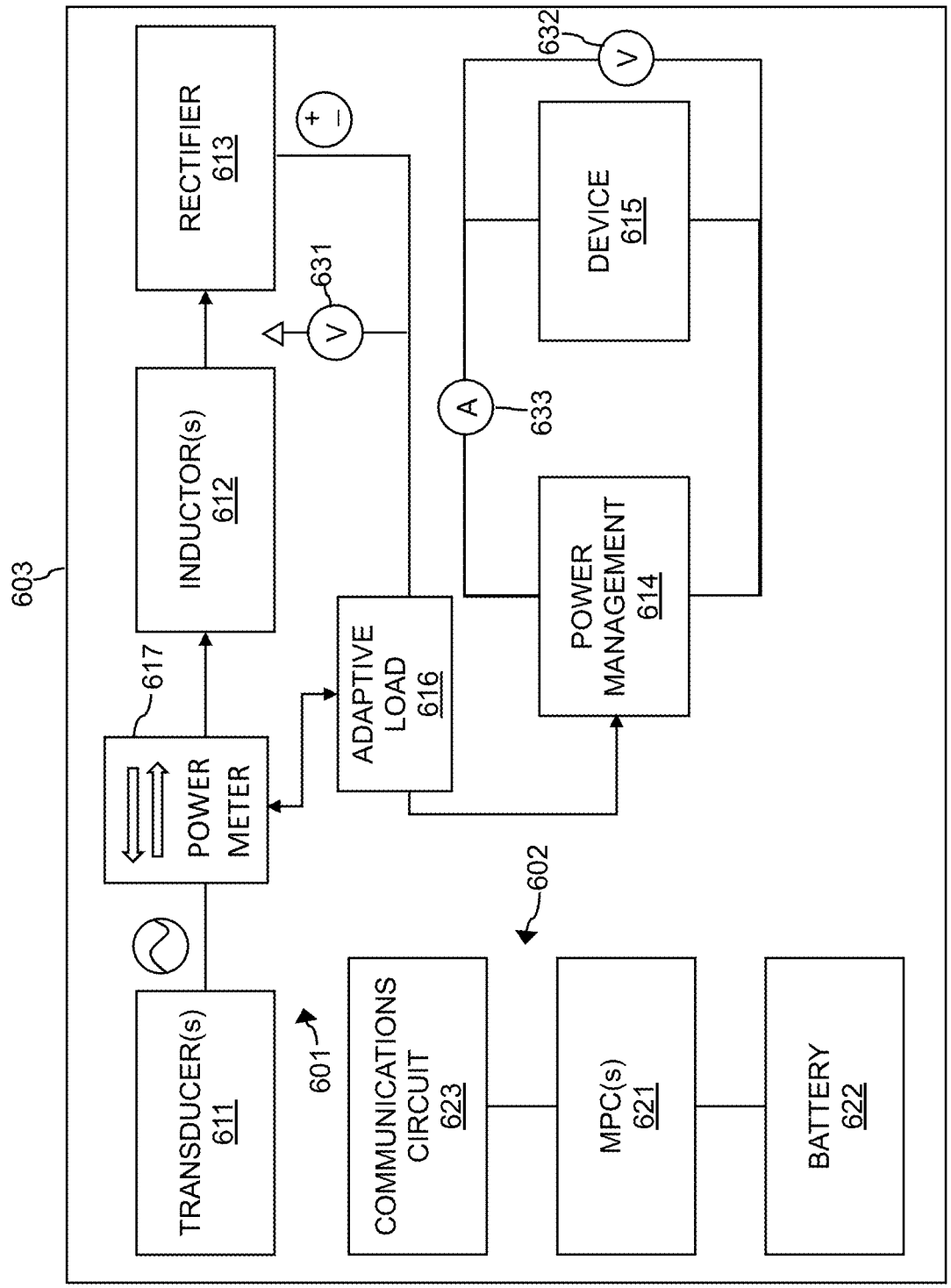
FIG. 6 is a block diagram of the implantable device illustrated in FIGS. 1 and 2 according to an embodiment.

FIG. 6 is a block diagram of the implantable device 130 according to an embodiment. The implantable device 130 includes an energy-harvesting circuit 601, a motion processing circuit 602, and a housing 603. The energy-harvesting circuit 601 includes one or more transducers 611, one or more inductors 612, a rectifier 613, a power management circuit 614, and a device 615. The transducer(s) 611 is/are configured to receive the acoustic energy 102 and convert the acoustic energy to electrical energy having an alternating current (AC). The transducer(s) 611 can comprise the same material(S) as the transducer(s) 315. The AC has the same frequency characteristics as the frequency of the acoustic energy 102. One or more inductors 612 is/are electrically coupled to the output of the transducer(s) 611 to provide inductive coupling and impedance matching. The inductor(s) 612 can include a network of inductors.

The rectifier circuit 613 converts the AC to a direct current (DC). A power management circuit 614 is electrically connected to an output of the rectifier circuit 613. The PMIC enables appropriate impedance coupling of the receiver ultrasound output to efficiently charge the battery at a safe voltage and current. The DC flows into the power management circuit 614 that can modify and/or regulate the DC voltage to a level suitable for the device 615. The power management circuit 614 can comprise an SPV1050 energy harvester integrated circuit available from STMicroelectronics, an OptiJoule energy harvester power-management integrated circuit (available from Trameto Limited), an LTC3330 available from Analog Devices, or another power management circuit. The power management circuit 614 can revert to a low-power mode, such as a sleep mode, when not in use for a predetermined time period. The power management circuit 614 can be programmable such as for firmware upgrade, data logging, and/or troubleshooting.

The power management circuit 614 can be in electrical communication with one or more voltage sensors and/or one or more current sensors. For example, the power management circuit 614 can be in electrical communication can be in electrical communication with voltage sensor 631, with voltage sensor 632, and/or with current sensor 633. Voltage sensor 631 is configured to measure the voltage across the rectifier circuit 613. Voltage sensor 632 is configured to measure the voltage across the device 615. Current sensor 633 is configured to measure the current flow to the device 615. The power management circuit 614 can use the output of one or more of the sensors 631-633 as feedback for example to keep the current flowing to the device 615 below a maximum current, to keep the voltage across the device below a maximum voltage, and/or to monitor the charging state of the device 615 when the device 615 comprises one or more batteries.

The device 615 can comprise one or more energy accumulation devices such as one or more capacitors and/or one or more inductors. Additionally or alternatively, the device 615 can comprise one or more energy storage devices such as one or more batteries. Additionally or alternatively, the device 615 can comprise a sensor (e.g., an acoustic sensor, an optical sensor, a temperature sensor, a pH sensor, and/or another sensor), a medical device, and/or another device. The energy accumulation device(s) and/or the energy storage device(s) can be used to power another device such as device 140 (FIGS. 1, 2).

In some embodiments, the rectifier circuit 613 is not included in the energy-harvesting circuit 601 to provide AC power to the device 615. The energy-harvesting circuit 601 can include RLC circuits, transformer/inductive circuits, and/or other circuits to condition the AC or DC signal.

The motion processing circuit 602 includes one or more MPUs 621 that is/are electrically connected to one or more batteries 622. The MPU(s) 621 can include an accelerometer, a goniometer, a magnetometer, and/or a gyroscope. MPU(s) 621 can be used to determine the three-dimensional position and orientation of the implantable device 130 and/or the relative three-dimensional position and orientation of the implantable device 130 with respect to the acoustic transmitter 100. Data from the MPU(s) 621 can be transmitted externally, such as to the implantable device 130 or to a computer or processor, using a communications circuit 623 that is electrically connected to the output of the MPU(s) 621. The communications circuit 623 can comprise a near-field communications circuit, a cellular communications circuit, a local communications circuit (e.g., a Bluetooth communications circuit), a MICS, and/or a WiFi communications circuit. The communications circuit 623 includes an antenna to broadcast wireless signals that represent the MPU data. The communications circuit 623 can form a closed-loop communication and alignment system with the communications circuit 323, for example to communicate three-dimensional position data from the MPU(s) 621 and/or to communicate various sensor data, such as temperature, pH, and/or other sensor data at multiple points in the body. Additionally or alternatively, the communications circuit 623 can include an ultrasound communication circuit.

In another embodiment, the energy-harvesting circuit 601 and the motion processing circuit 602 can be electrically connected. For example, when the device 615 comprises one or more batteries, these batteries can provide power to the motion processing circuit 602. Alternatively, the motion processing circuit 602 can be electrically connected to the output of the rectifier 613 or to the power management circuit 614.

The MPU(s) 621, the battery (ies) 622, and/or the communications circuit 623 can be the same as or different than the MPU(s) 321, the battery (ies) 322, and/or the communications circuit 323, respectively.

The energy-harvesting circuit 301 and the motion processing circuit 302 are sealed (e.g., hermetically sealed) in the housing 303. The housing 303 can comprise a polymer material (e.g., epoxy, polyurethane, and/or acrylic) or a biologically inert metal such as titanium, stainless steel, ceramic, or another metal. In some embodiments, the housing 303 can be coated with a metal, a polymer, such as parylene, and/or a metal-polymer layer, for implant protection and/or sealing. The housing 303 can form a capsule that can be round, cylindrical, spherical, rectangular (e.g., a rectangular prism), or another shape.

Figure 7:
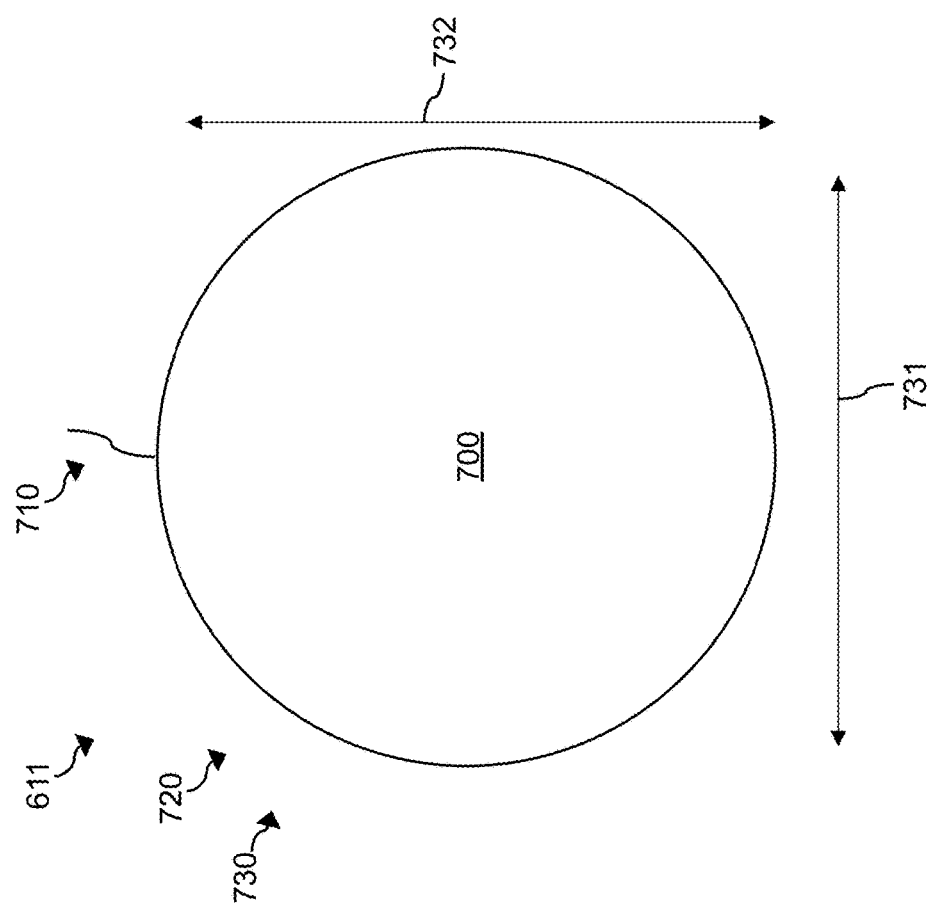
FIG. 7 is a top view of the transducer(s) illustrated in FIG. 6 according to an embodiment.

FIG. 7 is a top view of the transducer(s) 611 according to an embodiment. In this embodiment, the transducer(s) 315 is a single transducer element 700. In other embodiments, the transducer(s) 611 can include multiple transducer elements. An electrical wire or lead 710 is electrically connected to the transducer element 700 to output electrical energy that the transducer element 700 converts from the acoustic energy 102.

The dimensions of acoustically active region(s) 720 of the transducer(s) 611 define an acoustic aperture 730 of the transducer(s) 611. The transducer element 700 and the active region(s) 720 are planar and have an acoustic aperture 730 defined by (or corresponding to) a major axis 731 and a minor axis 732 of the transducer element 700 and/or of the transducer(s) 611. In FIG. 7, the transducer element 700 is circular (e.g., a disk) and thus, a length measured with respect to the major axis 731 and width measured with respect to the minor axis 732 are equal to a diameter of the transducer element 700. The transducer element 700 can have a cylindrical shape or another three-dimensional shape. The transducer element 700 and/or the transducer(s) 611 can be focused, weakly divergent, or an annular array.

Figure 8B:
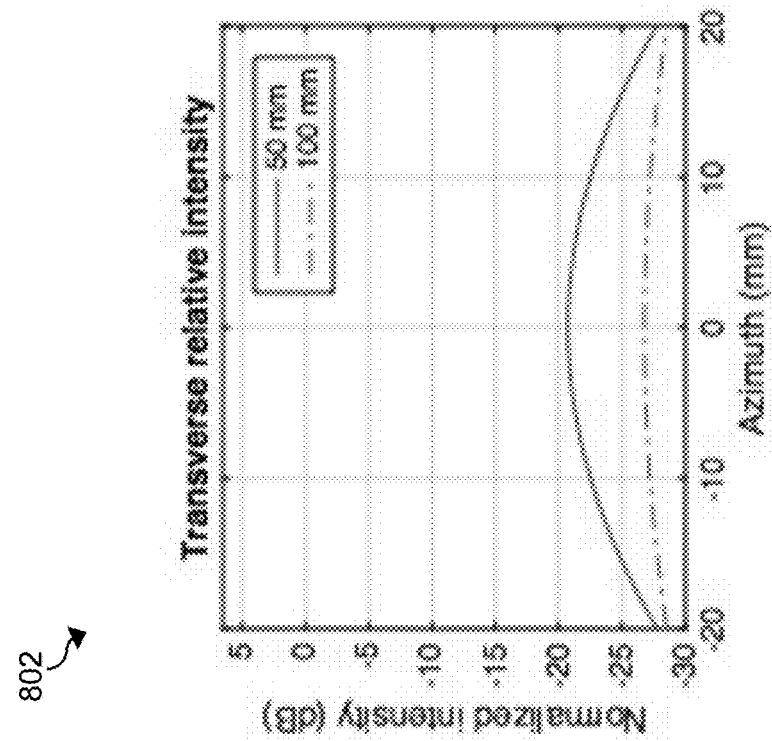
FIGS. 8A and 8B are example graphs of the normalized intensity of the acoustic energy received by the implantable device illustrated in FIGS. 1 and 2.
Figure 8A:
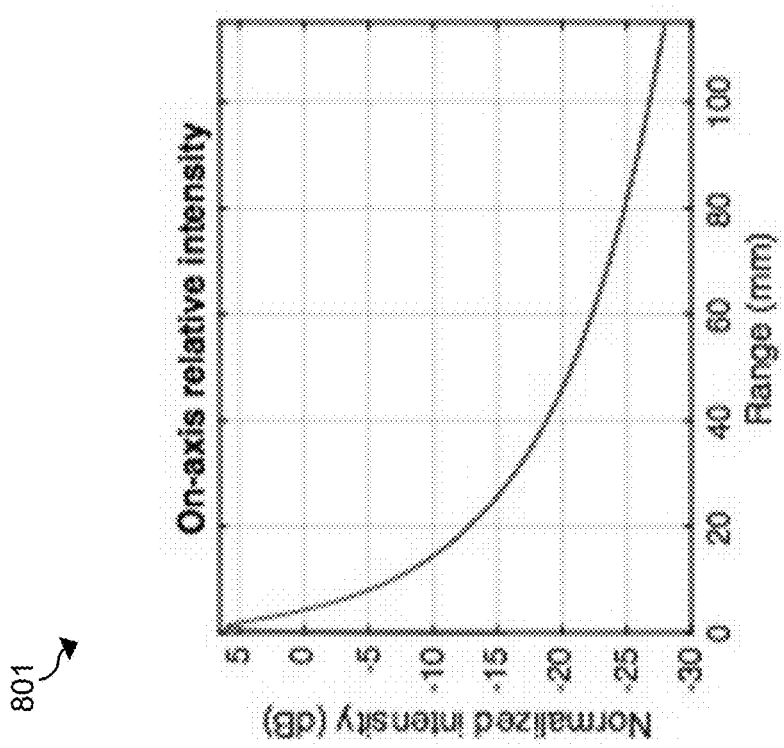

FIGS. 8A and 8B are example graphs 801, 802 of the normalized intensity of the acoustic energy 102 received by an implantable device 130. Graph 801 illustrates the normalized intensity of the received acoustic energy 102 along the beam axis of the active surface of the implanted acoustic transducer(s) 611 in the implantable device 130. The receiver transducer had a 3 mm diameter and was measured with an implantable device 130 submerged in water. As can be seen, the normalized intensity decreases rapidly between 0 mm and 40 mm but remains at a useable level up to about 120 mm, which indicates that significant energy from the acoustic energy 102 can be received at equivalent depths in a mammal.

Graph 802 illustrates the normalized intensity of the acoustic energy 102 in a traverse direction from the beam axis, as measured with the implantable device 130 submerged in water. A first series of simulations were performed at a distance of 50 mm, measured along the beam axis, from the transducer(s) 315. A second series of simulations were performed at a distance of 100 mm, measured along the beam axis, from the transducer(s) 315. As can be seen, the normalized intensity is relatively high within 20 mm of the beam axis (0 mm in FIG. 8B) indicating a wide angle of acceptance of the implantable device 130.

The traverse distance from the beam center can correspond to an acceptance angle range of about 60° (e.g., from −30° to +30°), of about 40° (e.g., from −20° to +20°), of about 20° (e.g., from −10° to +10°), and/or about any range between any two of the foregoing values, relative to the beam axis for the implantable device 130.

Figure 9:
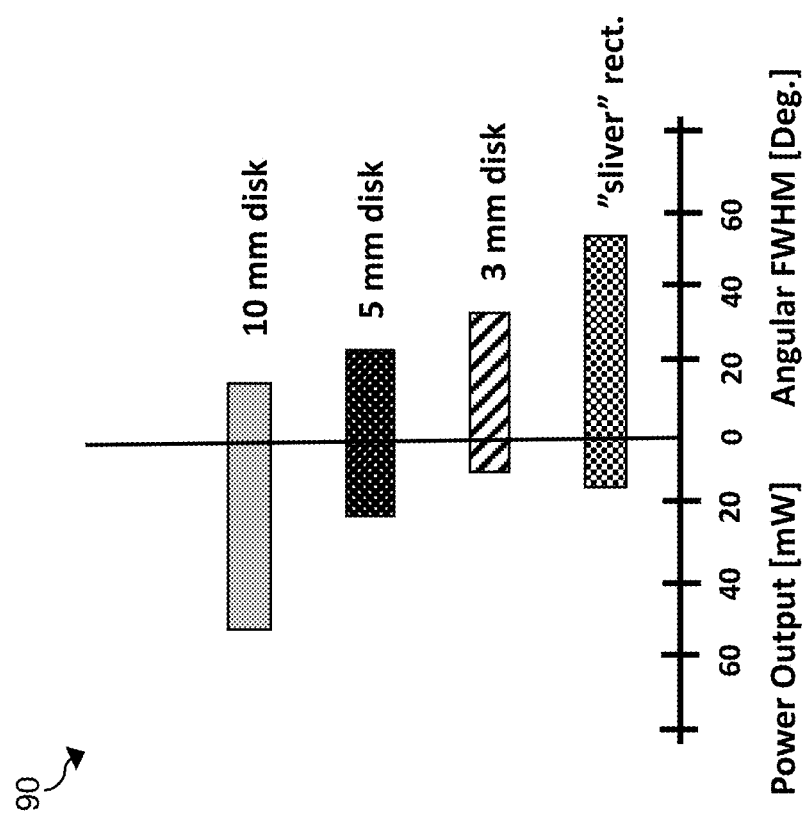
FIG. 9 is an example bar graph that illustrates the measured power output and acceptance angle range of the implantable device using different sizes and shapes of transducers.

FIG. 9 is an example bar graph 90 that illustrates the measured power output and acceptance angle range of the implantable device 130 using different sizes and shapes of transducers 611. The transmitted acoustic energy was 1 W using a 1 MHz transducer having a 25 mm diameter and as measured with an implantable device 130 submerged in water. Similar results can be obtained when normal saline is used as the acoustic conducting medium. As can be seen, the angular acceptance range (full width at half maximum (FWHM)) increases as the diameter of the transducer 611 decreases (e.g., from 10 mm to 3 mm) while the power output increases as the diameter of the transducer 611 increases (e.g., from 3 mm to 10 mm). Accordingly, there is a tradeoff between maximizing angular acceptance range and maximizing power output. A transducer 611 having a "sliver" rectangular shape (e.g., having dimensions of 3 mm length, 2 mm width, 0.3 mm thick) has the highest angular acceptance angle (about) ±30° but a relatively low power sensitivity.

FIGS. 10A and 10B are circuit diagrams 1001, 1002 of equivalent circuits for the energy-harvesting circuit 601 according to various embodiments. In circuit diagram 1001, the rectifier 613 is implemented as a fullwave bridge rectifier. In circuit diagram 1002, the rectifier 613 is implemented as a halfwave doubler rectifier. Example values for the electrical components in each circuit diagram 1001, 1002 are included. The examples values correspond to a transducer 611 having a sliver rectangular shape (dimensions of 3.2 mm length, 0.8 mm width, 0.3 mm thick) comprising a piezo ceramic and the acoustic energy 102 has a frequency of 1.03 MHz, corresponding to AC having the same frequency, but one or more of the example values can be other values in other embodiments.

In the rectifier circuits 613 of circuit diagrams 1001, 1002, the Schottky diodes can be replaced with active metal-oxide-semiconductor field-effect transistor (MOSFET)-based rectifiers. With active rectifiers, forward drop-out voltage and reverse leakage current can be avoided. The active load can feed the signal-conditioning circuit to convert AC to DC more efficiently without diode-thresholding.

Figure 11:
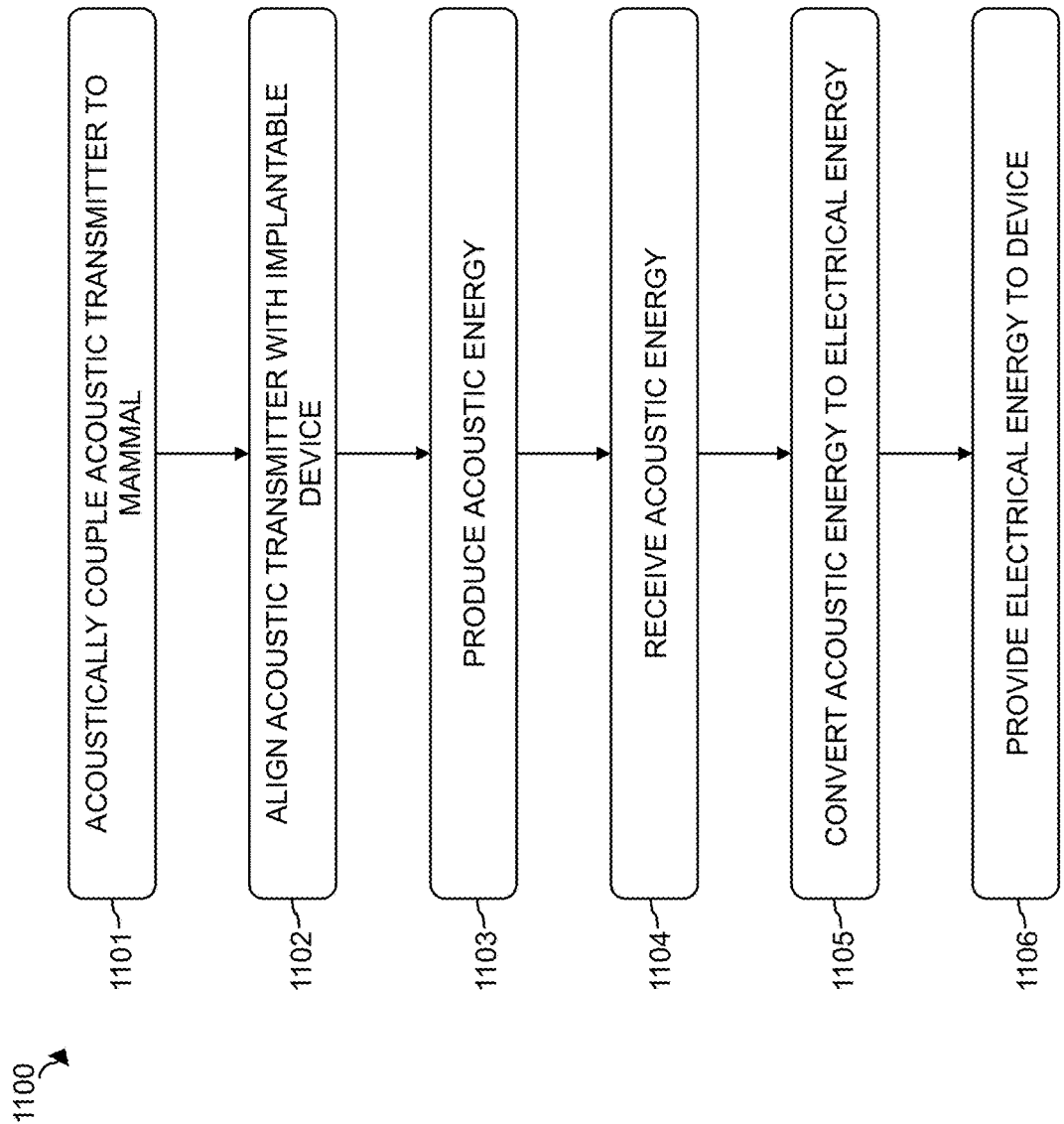
FIG. 11 is a flow chart for a method for providing electrical power to an implantable device using acoustic energy according to an embodiment.

FIG. 11 is a flow chart for a method 1100 for providing electrical power to an implantable device using acoustic energy according to an embodiment.

In step 1101, an acoustic transmitter 100 is acoustically coupled to a mammal 150. The acoustic transmitter 100 can be placed in direct physical contact with the mammal 150, such as in direct physical contact with an external surface 152 of the mammal 150 such as to the skin of a human. Alternatively, an acoustic transmission medium 106, such as an acoustic gel, can be in placed between and in direct physical contact with the acoustic transmitter 100 and the external surface 152 of the mammal 150.

In step 1102, the acoustic transmitter 100 is aligned with an implantable device 130 in the mammal 150. When the acoustic transmitter 100 is placed on the mammal 150 to acoustically couple the acoustic transmitter 100 and the mammal 150, the acoustic transmitter 100 can be placed in approximate alignment with the implantable device 130. For example, it may be known that the implantable device 130 was previously implanted in an anatomical feature 154, such as an organ, and the acoustic transmitter 100 can be placed at a location on the external surface 152 (e.g., skin) that corresponds or approximately corresponds to the anatomical feature 154. The implantable device 130 can be located at a predetermined distance, such as about 50 mm to about 140 mm, from the external surface 152 (e.g., skin).

In some embodiments, the acoustic transmitter 100 can be placed in approximate alignment with the implantable device 130 using acoustic (e.g., ultrasound) imaging of the implantable device 130 and/or of nearby anatomical features. The acoustic imaging can be performed using the acoustic transducer(s) 315 in the acoustic transmitter 100. Additionally or alternatively, the acoustic transmitter 100 can be placed in approximate alignment with the implantable device 130 by measuring, with the acoustic transducer(s) 611 in the implantable device 130, the acoustic energy 102 produced by the acoustic transmitter 100. For example, the acoustic transmitter 100 can produce pulses (or other waveforms) of acoustic energy that can measured with the acoustic transducer(s) 611 to determine (a) whether the pulses (or other waveforms) are received and (b) the magnitude of any acoustic energy pulses (or other waveforms) received.

The acoustic transmitter 100 can also be aligned with the implantable device 130 using the MPUs 321, 621.

In step 1103, the acoustic transmitter 100 produces acoustic energy 102. The acoustic energy 102 is output from the acoustic transducer(s) 315 and directed towards or approximately towards the implantable device 130. The acoustic energy 102 can have a frequency in the range of about 0.5 MHz to about 3 MHz.

In step 1104, the implantable device 130 receives the acoustic energy 102 using the acoustic transducer(s) 611. The acoustic energy 102 can have an angular offset with respect to an axis that is orthogonal to the acoustically active region(s) 720 of the transducer(s) 611 of up to 60°.

In step 1105, the implantable device 130 converts the acoustic energy 102 to electrical energy. The acoustic energy 102 can be converted by the acoustic transducer(s) 611. One or more electrical components and/or electrical circuits (e.g., in energy-harvesting circuit 601) can further convert AC electrical energy to DC electrical energy.

In step 1106, the converted electrical energy is provided to a device 615 that is electrically coupled to the acoustic transducer(s) 611. The electrical energy can be provided as AC electrical energy or as DC electrical energy. The device 615 can include one or more energy accumulation devices, one or more energy storage devices, one or more sensors, one or more medical devices, and/or another device(s). In some embodiments, the device 615 can be used to power another device such as a device 140.

Figure 12:
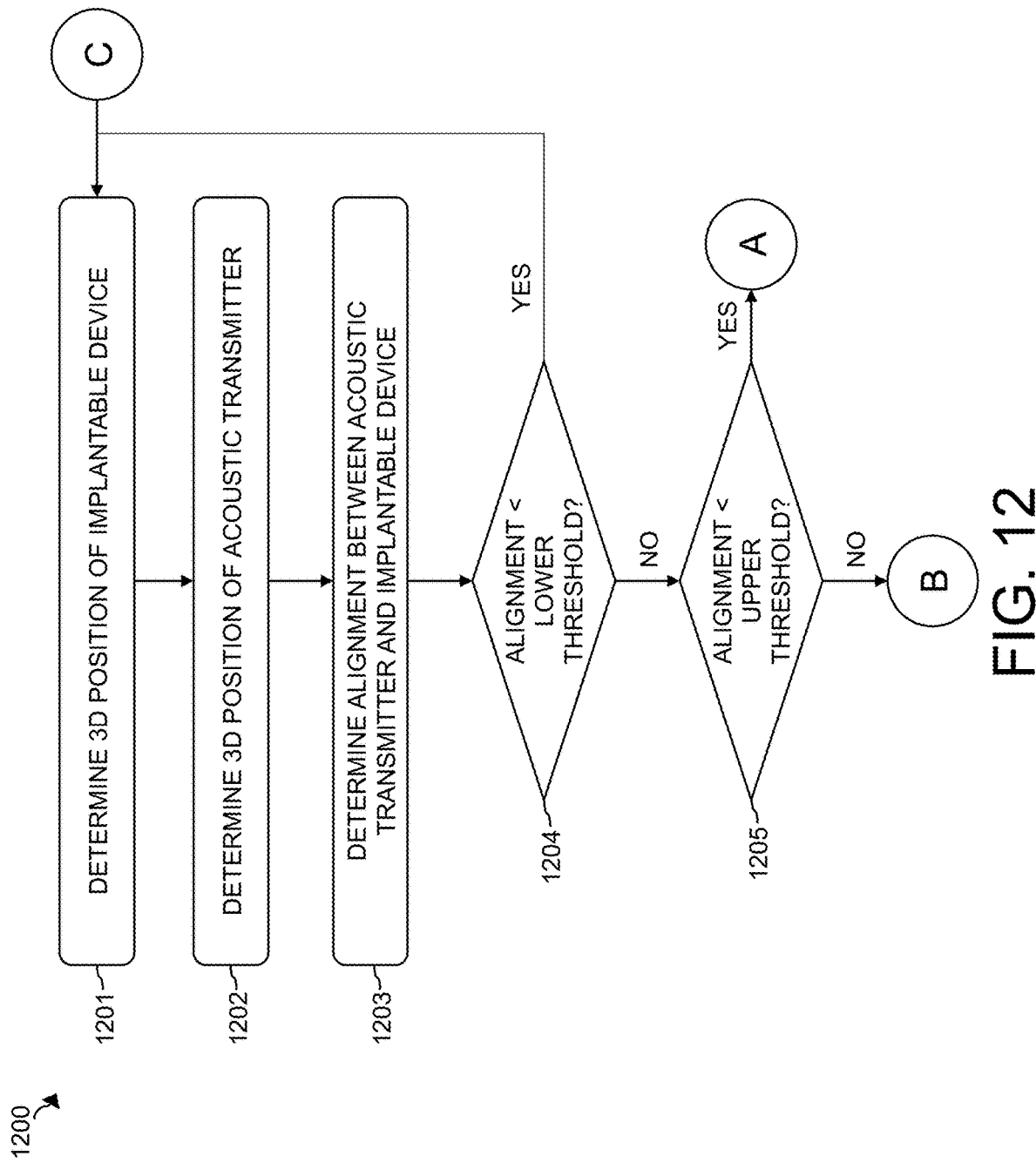
FIG. 12 is a flow chart of a method for aligning an acoustic transmitter and an implantable device with respect to each other while the implantable device is located in a mammal.
Figure 12:
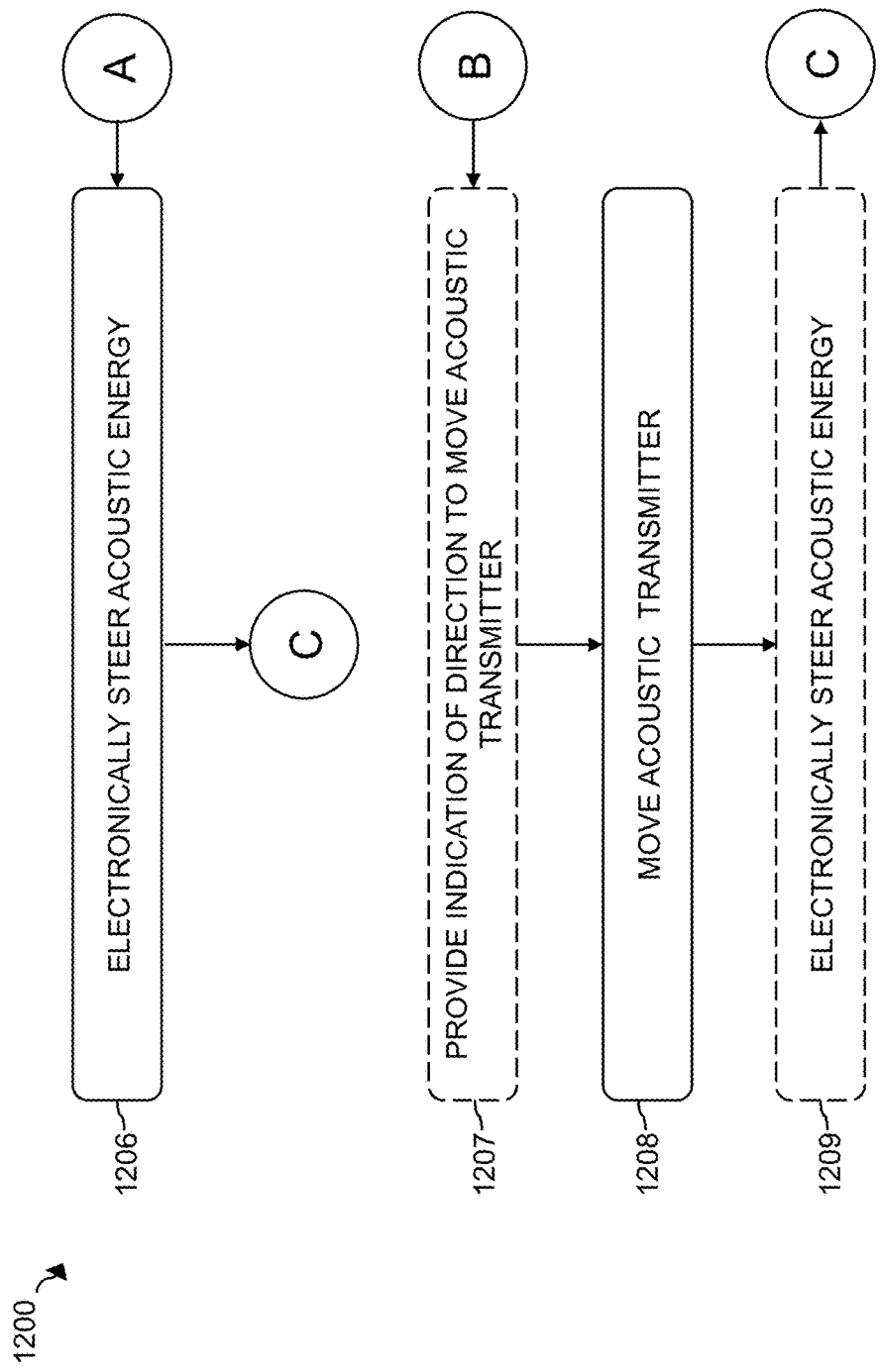

FIG. 12 is a flow chart of a method 1200 for aligning an acoustic transmitter 100 and an implantable device 130 with respect to each other while the implantable device is located in a mammal 150. Step 1102 can be performed according to method 1200.

In step 1201, the three-dimensional position of the implantable device 130 is determined. The three-dimensional position can be determined using the MPU(s) 621 in the implantable device 130. For example, the three-dimensional position can determined using an accelerometer, a goniometer, a magnetometer, and/or a gyroscope. The three-dimensional position can include the three-dimensional orientation of the implantable device 130.

In step 1202, the three-dimensional position of the acoustic transmitter 100 is determined. The three-dimensional position can be determined using the MPU(s) 321 in the acoustic transmitter 100. For example, the three-dimensional position can determined using an accelerometer, a goniometer, a magnetometer, and/or a gyroscope. The three-dimensional position can include the three-dimensional orientation of the acoustic transmitter 100.

In step 1203, the alignment between the acoustic transmitter 100 and the implantable device 130 is determined. The alignment can be determined by comparing the three-dimensional positions of the acoustic transmitter 100 and of the implantable device 130. In some embodiment, the alignment determination can also include comparing the three-dimensional orientations of the acoustic transmitter 100 and of the implantable device 130. The alignment determination can be performed by the MPU(s) 321 or by another device.

When the alignment is determined by the MPU(s) 321, the three-dimensional position data from the MPU(s) 621 are sent from the implantable device 130 to the MPU(s) 321 in the acoustic transmitter 100. For example, the three-dimensional position data from the MPU(s) 621 can be sent from the communications circuit 623 to the communication circuit 323. The three-dimensional orientation data from the MPU(s) 621 can also be sent from the communications circuit 623 to the communications circuit 323 to provide the three-dimensional orientation data from the MPU(s) 621 to the MPU(s) 321. The MPU(s) 321 can compare the three-dimensional position data and optional three-dimensional orientation data, determined with the MPU(s) 621, with the three-dimensional position data and optional three-dimensional orientation data, respectively, determined with the MPU(s) 321.

When the alignment is determined by another device, the three-dimensional position data from the MPU(s) 321 and from the MPU(s) 621 are sent to another device such as a computer 170 (FIG. 1) using the communications circuits 323, 623, respectively. The computer 170 includes a communications circuit that can receive the three-dimensional position data sent using the communications circuits 323, 623. The computer 170 can compare the three-dimensional position data and optional three-dimensional orientation data, determined with the MPU(s) 621, with the three-dimensional position data and optional three-dimensional orientation data, respectively, determined with the MPU(s) 321.

In step 1204 and 1205, the alignment determined in step 1203 is compared with lower and upper thresholds, respectively. When the alignment is lower than or equal to the lower threshold (i.e., step 1204=yes), the method 1200 returns to step 1201. When the alignment is lower than or equal to the upper threshold and higher than the lower threshold (i.e., step 1204=no and step 1205=yes), the method 1200 proceeds to step 1206 via placeholder A.

In step 1206, the acoustic energy 102 is electronically steered by varying the relative phase(s) of the driving signals for the acoustic transducers 315. A lookup table or a model can be used to determine the amount and direction of electronic steering. The lower and upper thresholds are set such that any misalignment therebetween can be at least partially compensated for using electronic steering. For example, the acoustic energy 102 can be electronically steered by up to about 10 degrees relative to the direction parallel to the length 431 of the acoustic transducers 315, as illustrated in FIG. 4. For example, the acoustic energy 102 without electric steering is generally sent along a beam axis 440 that is orthogonal to a plane defined by the length 431 and the width 432 (FIG. 4). The beam axis 440 can be varied by an electronic steering angle 442 in either direction with respect to the length 431.

When the alignment is determined by the MPU(s) 321, the MPU(s) 321 or the communications circuit 323 can send an output control signal to the signal generator 311 to vary the relative phase(s) of the one or more of the driving signals for the acoustic transducers 315 to electronically steer the acoustic energy 102. When the alignment is determined by the computer 170, the computer 170 can send the output control signal to the signal generator 311 via the communications circuit 323. Alternatively, the computer 170 can provide a visual indication (e.g., on a display screen electrically coupled to the computer 170) and/or an audio indication (e.g., through a speaker electrically coupled to the computer 170) of the direction and magnitude of electronic steering for the acoustic energy 102, a human can manually input the electronic steering parameters in the acoustic transmitter 100 or in the controller 110.

After the electronic steering is performed, the method 1200 returns to step 1201 via place holder C.

In step 1204 and 1205, when the alignment determined in step 1203 is higher than the lower threshold and the upper threshold (i.e., step 1204=no and step 1205=no), the method 1200 proceeds to optional step 1207 via placeholder B.

In optional step 1207, an output signal that represents a visual indication and/or an audio indication is/are provided that represent a direction and a distance to physically move the acoustic transmitter 100. When the alignment is determined by the MPU(s) 321, the MPU(s) 321 can output the visual indication on a display screen on the acoustic transmitter 100 and/or the audio indication through a speaker on the acoustic transmitter 100. Alternatively, the MPU(s) 321 can send (e.g., using the communications circuit 323) the visual and/or audio indication data to a computer 170 to display on a display screen and/or to output on a speaker electrically coupled to the computer 170.

When the alignment is determined by the computer 170, the computer 170 can produce a visual and/or an audio indication on a display screen and/or through a speaker electrically coupled to the computer 170.

In step 1208, the acoustic transmitter 100 is physically moved to reduce the misalignment between the acoustic transmitter 100 and the implantable device 130. The acoustic transmitter 100 can be physically moved by a human (e.g., manually). Alternatively, the acoustic transmitter 100 can be automatically moved using an automated positioning apparatus that mechanically supports the acoustic transmitter 100. The automated positioning apparatus can be in electrical communication with the MPU(s) 321 (e.g., via the communications circuit 323) and/or with the computer 170.

The acoustic transmitter 100 can be physically moved in three dimensions with 9 degrees of freedom.

In optional step 1209, the acoustic energy 102 can be electronically steered after the acoustic transmitter 100 is physically moved, for example to more closely align the acoustic transmitter 100 (e.g., the acoustic energy 102) with respect to the implantable device 130.

After the acoustic transmitter 100 is physically moved in step 1208 or after the optional electronic steering in step 1209, the method 1200 returns to step 1201 via placeholder C.

Figure 13A:
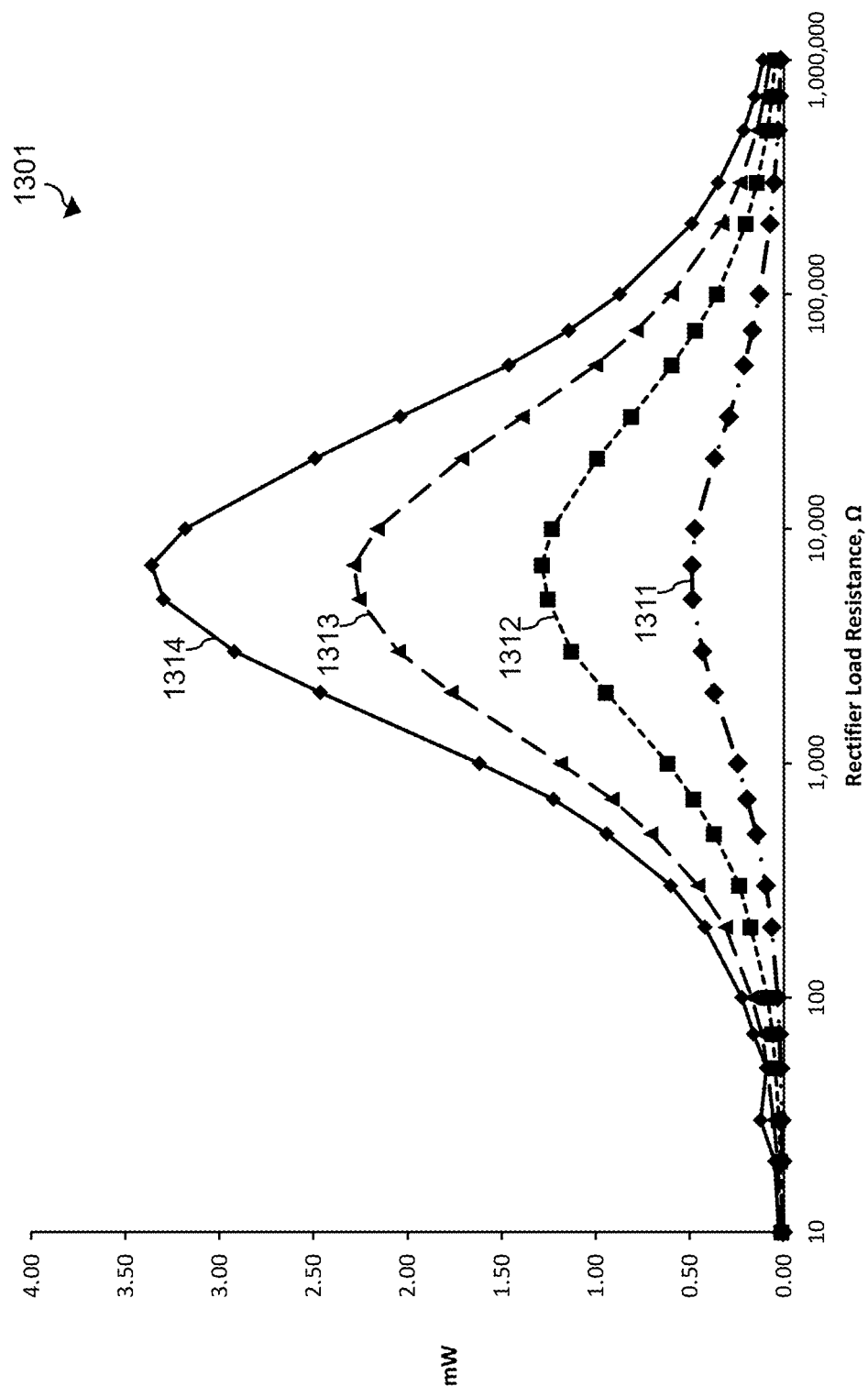
FIGS. 13A and 13B are example graphs that electrically characterize a prototype of the implantable device when the DC power supply has different drive DC voltages and the rectifier circuit is a half-wave doubler rectifier.
Figure 13B:
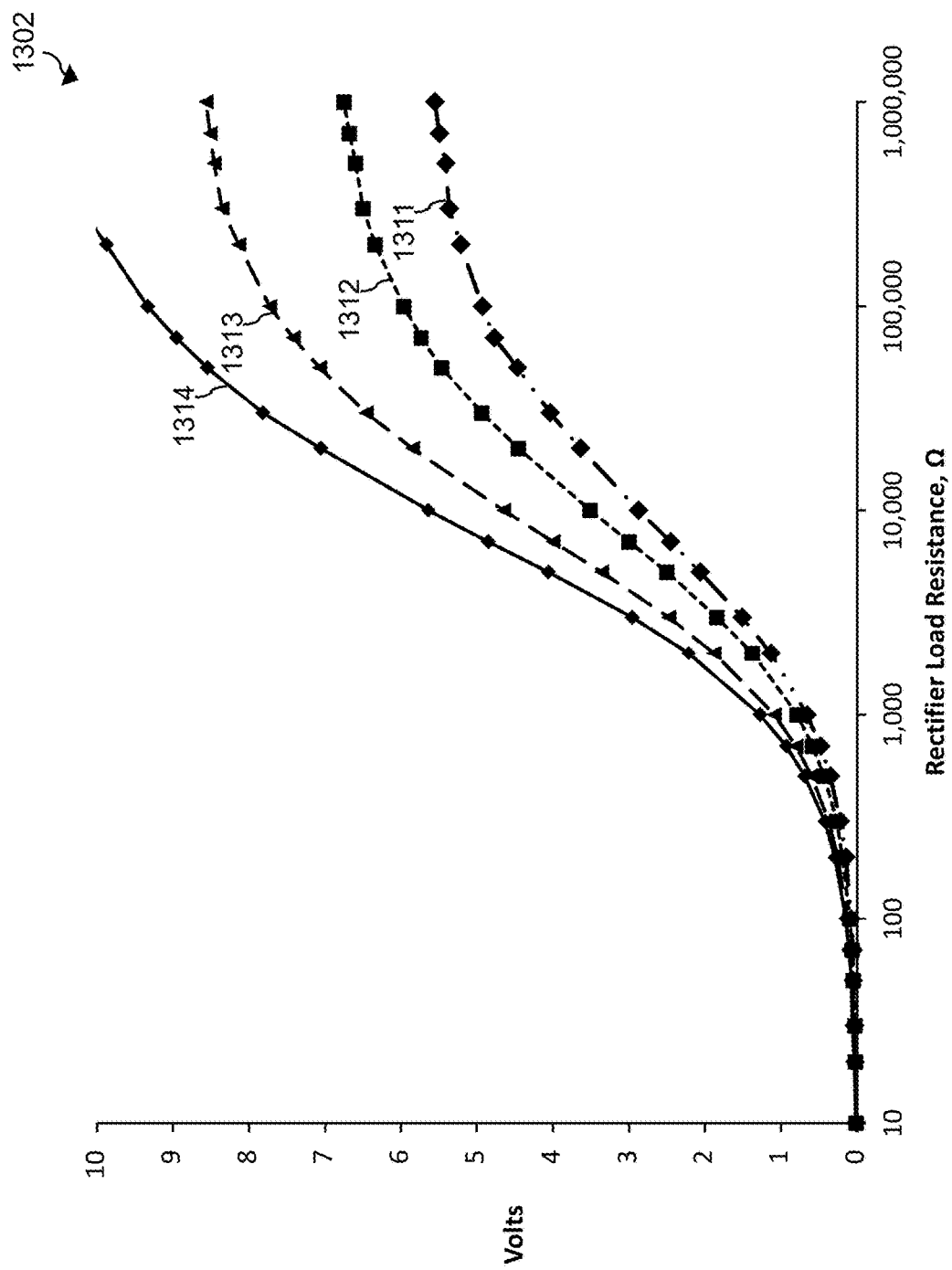

FIGS. 13A and 13B are example graphs 1301, 1302 that electrically characterize a prototype of the implantable device 130 when the DC power supply 312 has different drive DC voltages 1311-1314 and the rectifier circuit 613 is a half-wave doubler rectifier (e.g., as illustrated in circuit 1002). The DC drive voltages 1311-1314 were 5V, 6V, 8V, and 10V, respectively. The transducer 611 had a sliver rectangular shape (dimensions of 3.2 mm length, 0.8 mm width, 0.3 mm thick) comprising a piezo ceramic and the acoustic energy 102 had a frequency of 1.03 MHz. The acoustic transmitter 100 and the implantable device 130 were aligned and spaced 90 mm apart with the implantable device 130 submerged in water.

Graph 1301 shows the power received at the implantable device 130 as a function of rectifier load resistance at the implantable device 130 and as a function of DC drive voltages 1311-1314. A maximum received power of about 3.5 mW occurs when the rectifier circuit 613 has a load resistance of about 9,000 Ohms at the power management chip input, and the DC drive voltage for the transmitter push-pull driver (e.g., RF driver 313 (FIG. 3)) is 10V. Graph 1302 shows the voltage at the implantable device 130 as a function of load resistance at the implantable device 130 and as a function of DC drive voltages 1311-1314.

Similar graphs 1301, 1302 were created with a transducer 611 having a 3 mm diameter and with a transducer having a 5 mm diameter.

Figure 14A:
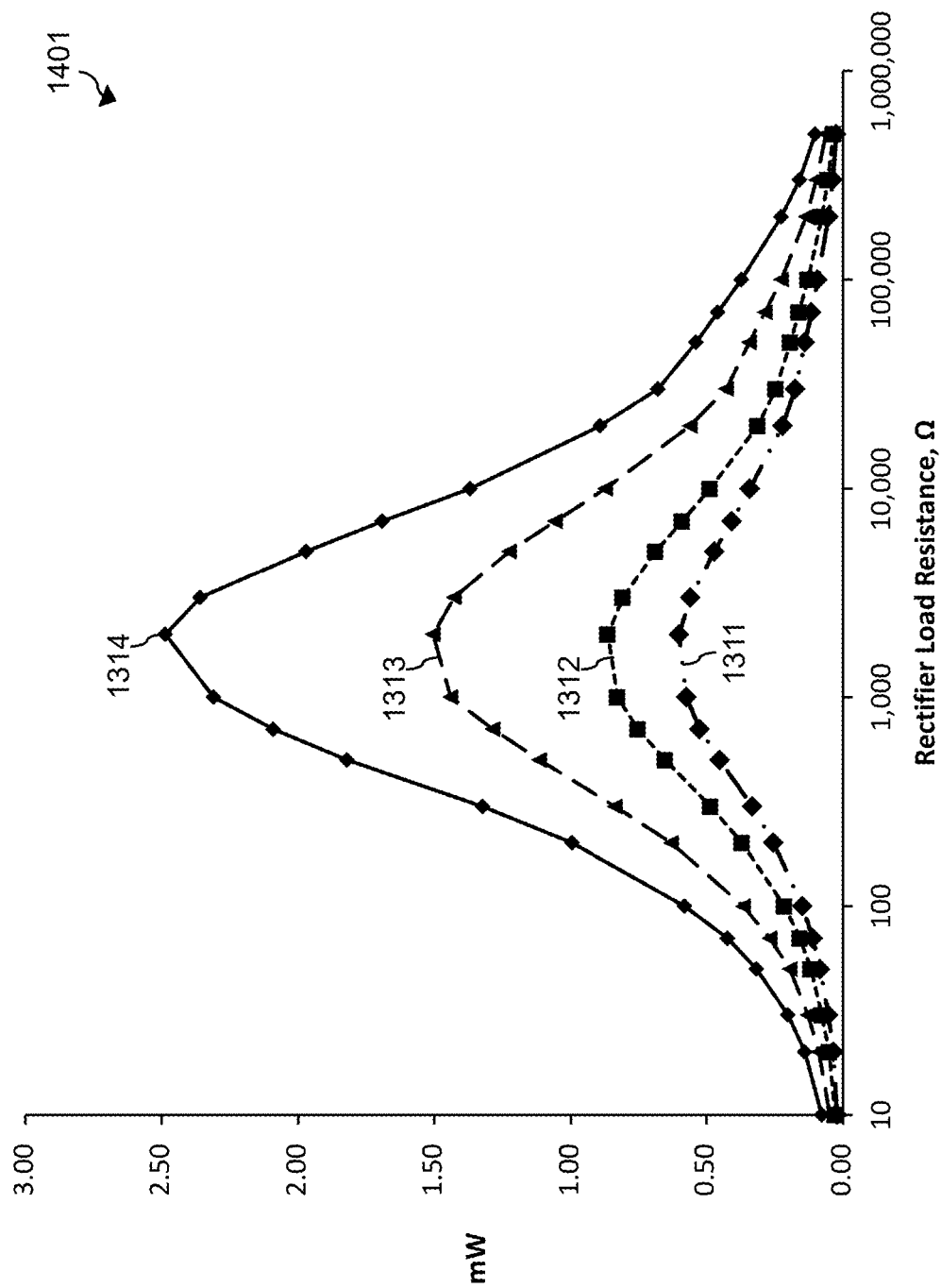
FIGS. 14A and 14B are example graphs that electrically characterize a prototype of the implantable device when the DC power supply has different drive DC voltages and the rectifier circuit is a fullwave bridge rectifier.
Figure 14B:
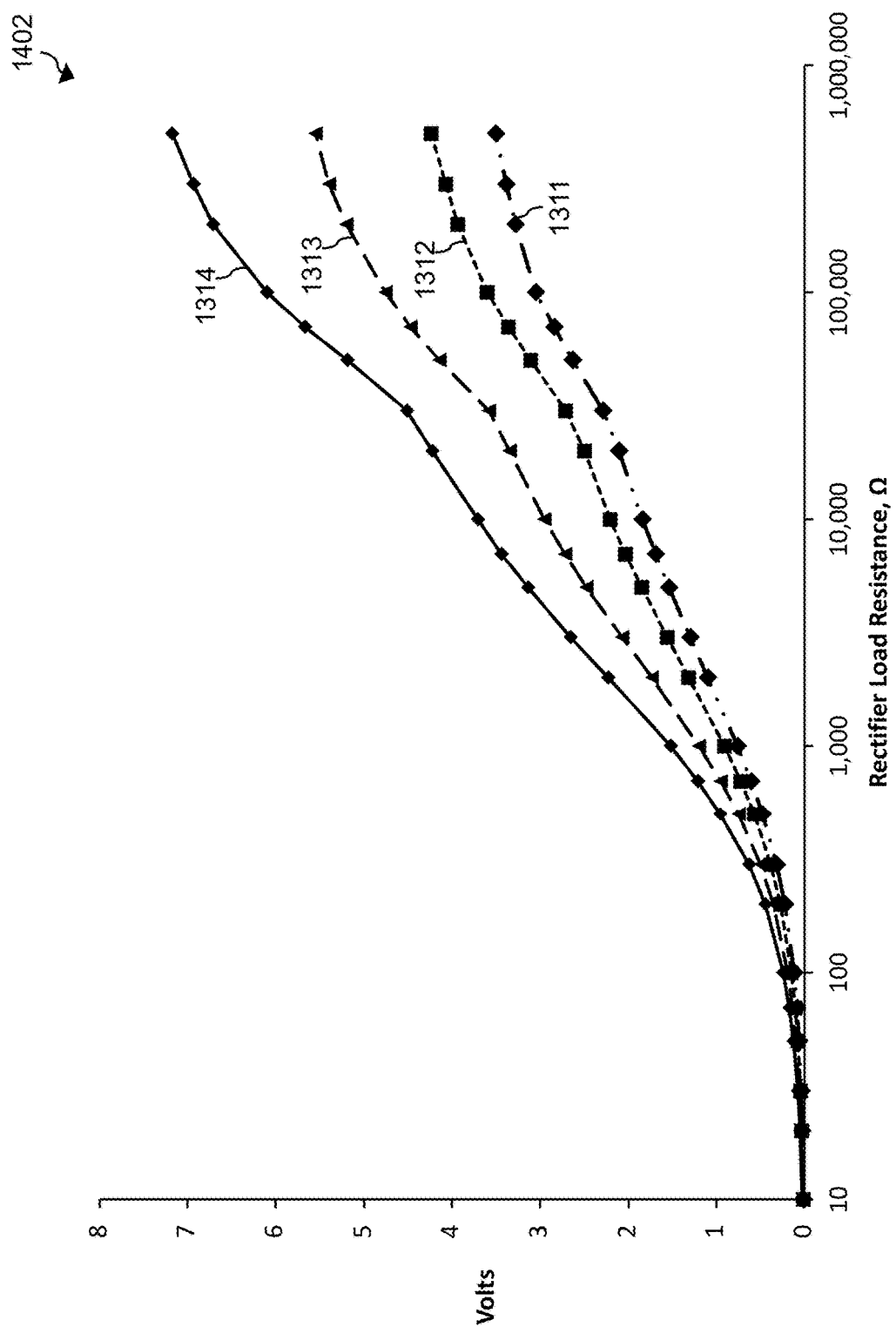

Similar graphs 1401, 1402 were also created when the rectifier circuit 613 is a fullwave bridge rectifier (e.g., as illustrated in circuit 1001), as illustrated in FIGS. 14A and 14B, respectively. Graph 1401 shows that a maximum received power of about 3.5 mW occurs when the rectifier circuit 613 has a load resistance of about 2,000 Ohms and the DC drive voltage is 10V.

The charge current and voltage at the power management circuit 614 can be controlled by a charge current feedback circuit using an RF-link (e.g., RF-transceiver ZL70323 available from Microchip Technology Inc.) or a wired link. The performance of the implantable device 130 can be optimized by using an adaptive load 616 (FIG. 6) that varies based on measurement of the forward and reverse signal voltage by a power meter 617 (FIG. 6), coupled to an output of the transducer(s) 611, which is a function of frequency. A load-mismatch is indicated by the voltage standing wave ratio diverging from "1." The adaptive load 616 can then be modified to optimize received power.

Receiver circuit performance is based on matching of its load as seen by the frequency-dependent receiver signal.

Figure 15A:
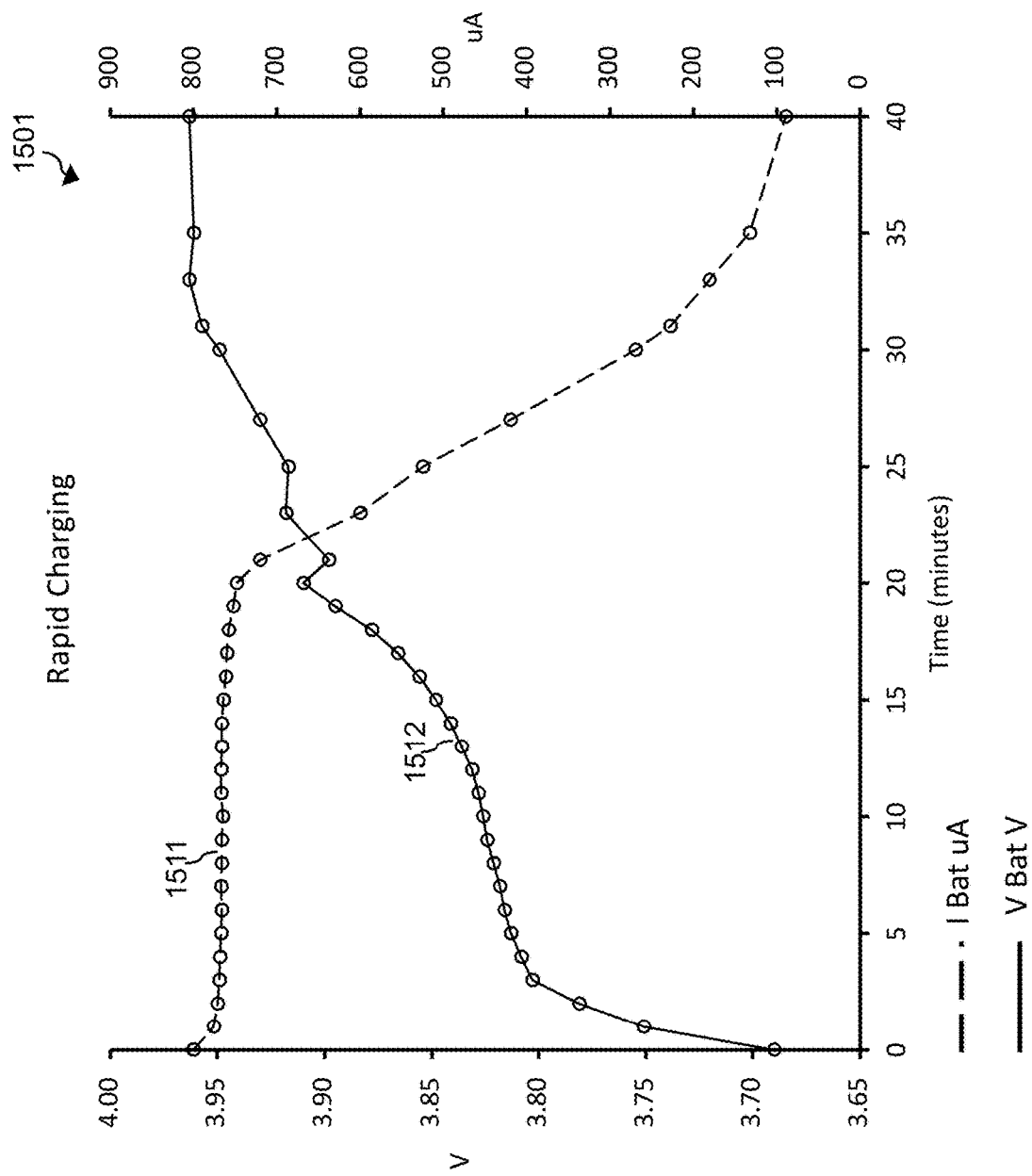
FIGS. 15A and 15B are example graphs that show current, voltage and power of an example solid-state battery in a prototype of the implantable device with respect to time, during rapid-charging.
Figure 15B:
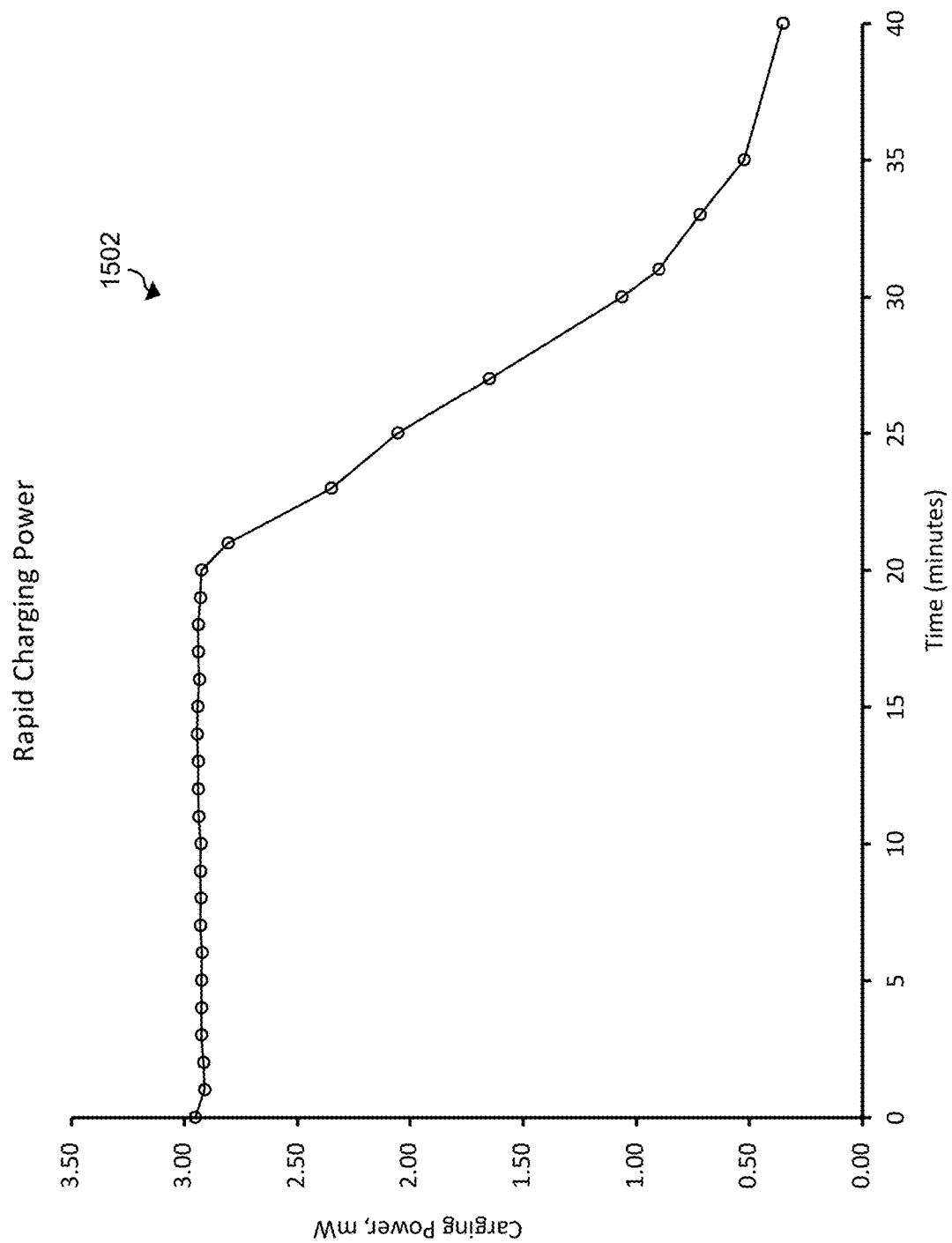

FIGS. 15A and 15B are example graphs 1501, 1502 that show the charging of an example 250 µAh solid-state battery (e.g., device 615) in a prototype of the implantable device 130 with respect to time. The implantable device 130 had an overall volume of about 1 mm$^3$ (3 mm length×1 mm width×0.3 mm thick) and the acoustic transmitter 100 had a transducer 315 that was 25 mm in diameter operating at 1 MHz. The acoustic transmitter 100 and the implantable device 130 were aligned and spaced 90 mm apart with the implantable device 130 submerged in water. The estimated power of the acoustic energy 102 was about 0.25 W.

In graph 1501, line 1511 represents the current at the battery and line 1512 represents the voltage across the battery. As can be seen in graph 1501, the battery can be rapidly charged in about 20 minutes (e.g., 3C). Graph 1502 illustrates that the power delivered to the battery tapers off quickly after rapid continuous charging.

Figure 16:
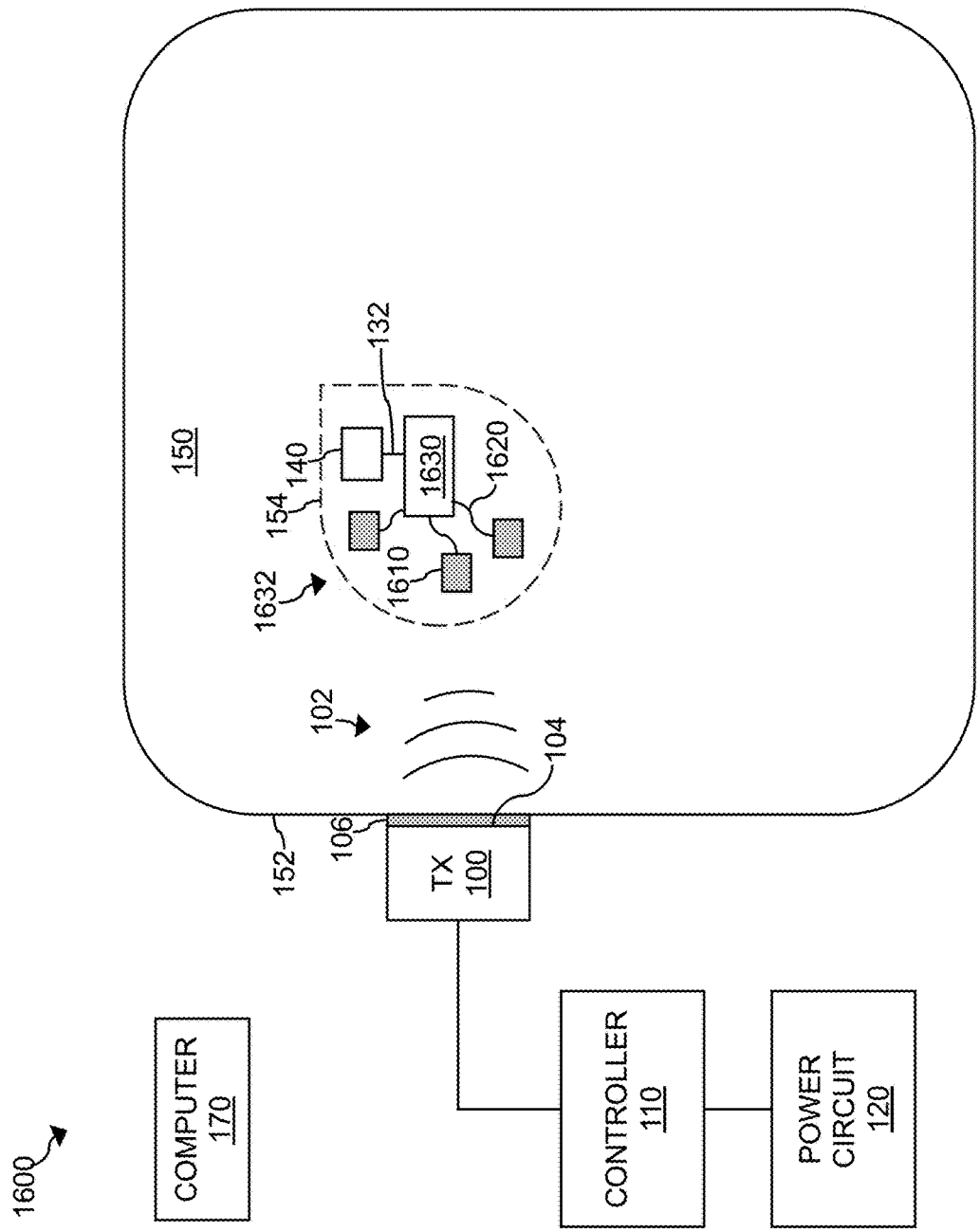
FIG. 16 is a block diagram of a spatially-diverse system for providing electrical energy to a device located in a mammal according to another embodiment.

FIG. 16 is a block diagram of a system 1600 for providing electrical energy to a device located in a mammal according to another embodiment. The system 1600 is the same as system 10 except that in system 1600 an implantable electrical device 1630 is electrically connected to a plurality of implantable transducers 1610 through wires 1620 to form an implantable apparatus 1632. The implantable electrical device 1630 can include one or more additional transducers. The implantable transducers 1610 are configured to be implanted in different locations in the mammal to provide spatial diversity for the implantable electrical device 1630 that improve the likelihood that the acoustic transmitter 100 is aligned with at least one of the transducers (e.g., an implantable transducer 1610 and/or a transducer in the implantable electrical device 1630) without having to physically move the implantable device 1630.

Figure 17:
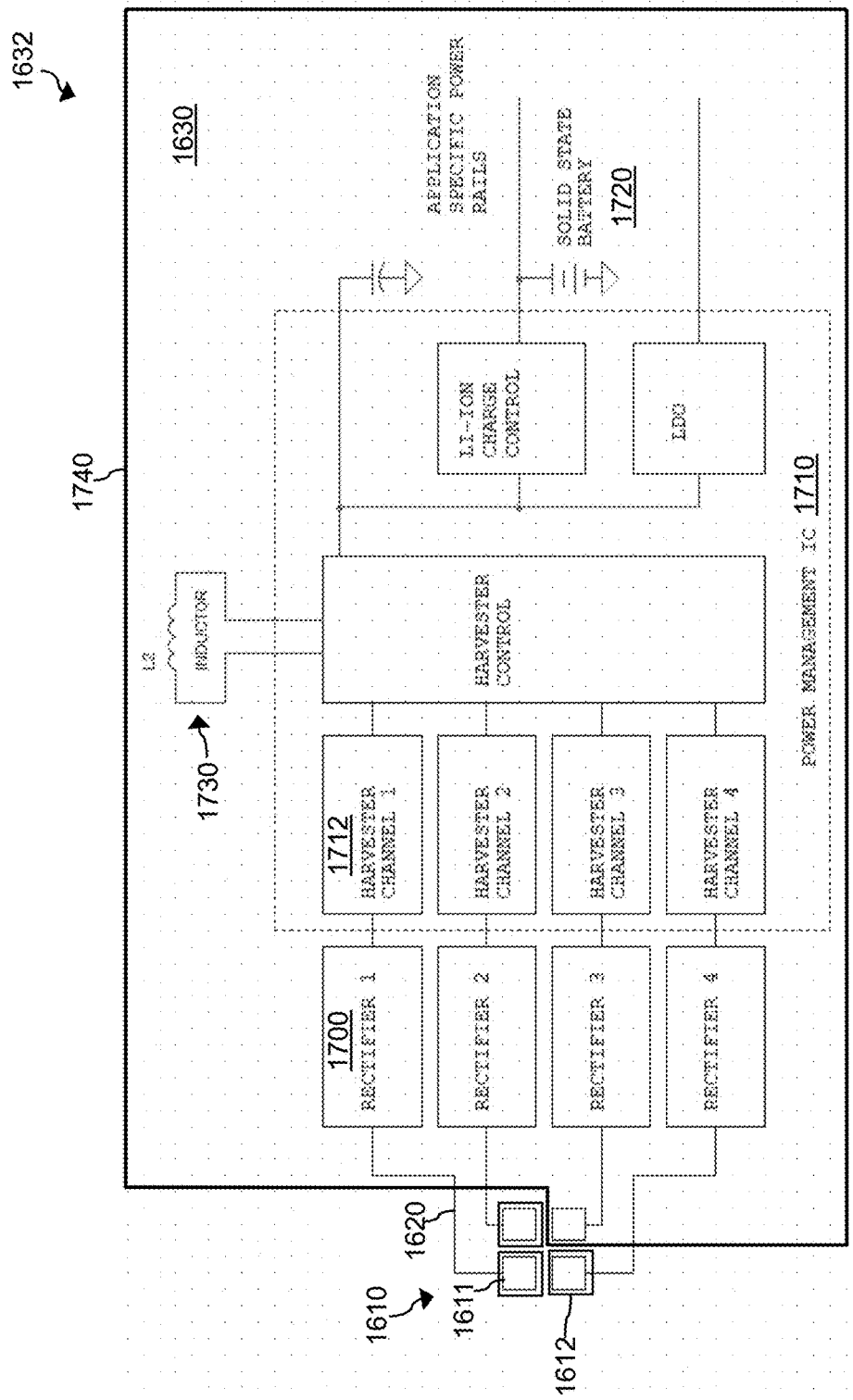
FIG. 17 is a block diagram of implantable apparatus illustrated in FIG. 16 according to an embodiment.

FIG. 17 is a block diagram of implantable apparatus 1632 according to an embodiment. Each implantable transducer 1610 includes a housing 1612 that encloses a respective transducer(s) 1611. Each transducer 1611 is enclosed in a separate housing 1612 and can be implanted in a separate location in the mammal. The implantable electrical device 1630 is enclosed in a separate housing 1740 and includes an optional transducer 1611.

Each transducer 1611 is electrically connected to the input of a respective rectifier circuit 1700. The output of each rectifier circuit 1700 is electrically connected to a respective harvester channel 1712 in a power management circuit 1710. The output of the power management circuit 1710 is electrically connected to a device such as a battery 1720 to provide DC power thereto (e.g., to charge the battery 1720). An inductor 1730 can correspond to the inductor 612 (FIG. 6).

The power management circuit 1710 can be a phase-insensitive multiport power management board where voltages from each transducer 1611 are added. Examples of the power management circuit 1710 include the OptiJoule TM2010, the OptiJoule TM 2020, or the OptiJoule TM 2040, available from Trameto Ltd. The components of the implantable electrical device 1630 can be electrically mounted on a PCB or on a chip, which can provide multiple-functionality within the implant. Each piezoelectric transducer 1611 can be fabricated from lead zirconate titanate (PZT) or as a silicon-based capacitive micro-machined transducer (CMUT) or from other viable piezoelectric materials. Depending on dimensional form factor and/or material, each transducer 1611 and/or the implantable electrical device 1630 can be integrated on a single application specific silicon chip.

MPUs are incorporated in the primary implant and can be incorporated in the transmitter powerpac, to monitor drift of the implantable device 130 after insertion.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method comprising:
    acoustically coupling an acoustic transmitter to an external surface of a mammal at an approximate location of an implantable device disposed in the mammal, the acoustic transmitter includes a plurality of transmitting ultrasound transducers;
    producing, with the acoustic transmitter, acoustic energy having a frequency in a frequency range of about 0.5 MHz to about 3 MHz;
    receiving the acoustic energy with one or more transducers in the implantable device, the one or more transducers electrically connected to an electric circuit, the one or more transducers having a length in a length range of about 1 wavelength to about 10 wavelengths of the acoustic energy;
    converting, with the one or more transducers, the acoustic energy to electric energy; and
    providing the electric energy to a device electrically connected to the electric circuit;
    measuring, with a first motion processing circuit (MPC) in the implantable device, a first three-dimensional position of the implantable device;
    measuring, with a second MPC in the acoustic transmitter, a second three-dimensional position of the acoustic transmitter;
    wirelessly sending the first three-dimensional position from the implantable device to the acoustic transmitter;

determining, with the second MPC, an alignment of the implantable device and the acoustic transmitter based on the first and second three-dimensional positions;

when the alignment is higher than or equal to a lower alignment threshold and less than an upper alignment threshold, automatically adjusting a relative phase of one or more of the transmitting ultrasound transducers to electronically steer the acoustic energy to reduce an incidence angle of the acoustic energy at the implantable device compared to when no electronic steering is performed; and when the alignment is higher than or equal to the upper alignment threshold, producing an output signal indicating a direction to physically move the acoustic transmitter.

2. The method of claim 1, wherein the implantable device is located in a range of about 50 mm to about 140 mm from the external surface of the mammal.

3. The method of claim 1, wherein:
the one or more transducers convert the acoustic energy to an alternating current (AC) electric energy, and
the method further comprises:
converting, with a rectifier in the electric circuit, the AC electric energy to a direct current (DC) electric energy; and
providing the DC electric energy to the device.

4. The method of claim 3, wherein:
the device comprises a battery, and
the method further comprises charging the battery with the DC electric energy.

5. The method of claim 3, wherein:
the device comprises a sensor, and
the method further comprises powering the sensor with the DC electric energy.

6. The method of claim 1, wherein:
automatically adjusting the relative phase of one or more of the transmitting ultrasound transducers further comprises using a look-up table or a model to determine the relative phase, such that an adjusted incidence angle is less than or equal to 60 degrees.

7. A system comprising:
an acoustic transmitter including:
a first housing;
one or more transmitting acoustic transducers disposed in the first housing, the one or more transmitting acoustic transducers configured to produce acoustic energy having a frequency in a frequency range of about 0.5 MHz to about 3 MHz;
a second motion processing circuit (MPC) configured to measure a second three-dimensional position of the acoustic transmitter; and
a second communications circuit electrically connected to the second MPC; and
an implantable device configured to be implanted in a mammal, the implantable device including:
a second housing;
one or more receiving acoustic transducers disposed in the second housing, the one or more transducers having a length in a length range of about 1 wavelength to about 10 wavelengths of the acoustic energy, the one or more receiving acoustic transducers configured to convert the acoustic energy to electric energy;
a device electrically coupled to the one or more receiving acoustic transducers to receive the electric energy, the device disposed in the second housing;
a first MPC configured to measure a first three-dimensional position of the implantable device; and
a first communications circuit electrically connected to the first MPC,
wherein:
the first communications circuit is configured to send the first three-dimensional position to the second communications circuit,
the second communications circuit is configured to provide the first three-dimensional position to the second MPC, and
the second MPC is configured to determine an alignment of the acoustic transmitter and the implantable device using the first and second three-dimensional positions,
the second MPC is configured to compare the alignment with lower and upper alignment thresholds,
when the alignment is higher than or equal to a lower alignment threshold and less than an upper alignment threshold, the second MPC is configured to produce an output signal causing a relative phase of one or more of the transmitting ultrasound transducers to be adjusted so as to electronically steer the acoustic energy to reduce an incidence angle of the acoustic energy at the implantable device compared to when no electronic steering is performed, and
when the alignment is higher than or equal to the upper alignment threshold, the second MPC is configured to produce an output signal indicating a direction to physically move the acoustic transmitter.

8. The system of claim 7, wherein the implantable device is configured to be implanted in a range of about 50 mm to about 140 mm from an external surface of the mammal.

9. The system of claim 7, wherein:
the one or more receiving acoustic transducers is/are configured to convert the acoustic energy to an alternating current (AC) electric energy, and
the one or more receiving acoustic transducers is/are electrically connected to a circuit that includes:
a rectifier that converts the AC electric energy to a direct current (DC) electric energy; and
a power management circuit electrically coupled to an output of the rectifier, the power management circuit configured to provide the DC electric energy to the device.

10. The system of claim 9, wherein the device comprises a battery.

11. The system of claim 7, wherein an acoustic aperture of the one or more transmitting acoustic transducers is greater than about 10 wavelengths of the acoustic energy.

* * * * *